US008937108B2

(12) United States Patent
McEvoy et al.

(10) Patent No.: US 8,937,108 B2
(45) Date of Patent: Jan. 20, 2015

(54) POLYURETHANE FOAM FORMULATION, PRODUCTS AND METHODS

(75) Inventors: James T. McEvoy, Howell, MI (US); Terrence M. McRoberts, Holly, MI (US); Ryoko Yamasaki, Ypsilanti, MI (US); William Li, Ypsilanti, MI (US); Murray D. Metcalfe, Shanghai (CN)

(73) Assignee: Johnson Controls Technology Company, Holland, MI (US)

( * ) Notice: Subject to any disclaimer, the term of this patent is extended or adjusted under 35 U.S.C. 154(b) by 1179 days.

(21) Appl. No.: 12/521,505

(22) PCT Filed: Dec. 28, 2007

(86) PCT No.: PCT/US2007/089075
§ 371 (c)(1),
(2), (4) Date: May 14, 2010

(87) PCT Pub. No.: WO2008/083295
PCT Pub. Date: Jul. 10, 2008

(65) Prior Publication Data
US 2010/0291369 A1 Nov. 18, 2010

Related U.S. Application Data

(60) Provisional application No. 60/877,889, filed on Dec. 29, 2006, provisional application No. 60/877,927, filed on Dec. 29, 2006.

(51) Int. Cl.
*C08G 18/28* (2006.01)

(52) U.S. Cl.
USPC .......................... 521/170; 521/130; 521/174

(58) Field of Classification Search
USPC .......................................... 521/130, 170, 174
See application file for complete search history.

(56) References Cited

U.S. PATENT DOCUMENTS

| | | |
|---|---|---|
| 3,377,296 A | 4/1968 | Dwyer |
| 4,049,590 A | 9/1977 | Falkenstein |
| 4,212,954 A | 7/1980 | Nomura |
| 4,304,872 A | 12/1981 | Tenhagen |
| 4,579,700 A | 4/1986 | Cavender |
| 4,661,529 A | 4/1987 | Kuhn |
| 4,689,357 A | 8/1987 | Hongu |
| 4,701,474 A | 10/1987 | Bailey, Jr. |
| 4,717,518 A | 1/1988 | Cavender |
| 4,792,575 A | 12/1988 | Takao |
| 4,797,378 A | 1/1989 | Sowman |
| 4,811,439 A | 3/1989 | Siegel |
| 4,866,102 A | 9/1989 | Pray |
| 4,883,707 A | 11/1989 | Newkirk |
| 4,883,825 A | 11/1989 | Westfall |
| 4,886,256 A | 12/1989 | Nishiyama |
| 4,910,076 A | 3/1990 | Ando |
| 4,923,904 A | 5/1990 | Hasegawa |
| 4,954,560 A | 9/1990 | Gerkin |
| 5,010,117 A | 4/1991 | Herrington |
| 5,017,316 A | 5/1991 | Sowman |
| 5,082,868 A | 1/1992 | Burkhart |
| 5,084,486 A | 1/1992 | Patten |
| 5,094,318 A | 3/1992 | Maeda |
| 5,106,874 A | 4/1992 | Porter |
| 5,155,788 A | 10/1992 | Chapin |
| 5,187,127 A | 2/1993 | Goto |
| 5,334,414 A | 8/1994 | Edie |
| 5,349,040 A | 9/1994 | Trinks |
| 5,433,777 A | 7/1995 | Sheppard |
| 5,451,615 A | 9/1995 | Birch |
| 5,480,710 A | 1/1996 | Frankosky |
| 5,489,618 A | 2/1996 | Gerkin |
| 5,504,282 A | 4/1996 | Pizzirusso |
| 5,512,361 A | 4/1996 | Takeuchi |
| 5,549,841 A | 8/1996 | Kinkelaar |
| 5,560,452 A | 10/1996 | Labougle |
| 5,582,906 A | 12/1996 | Romesberg |
| 5,650,452 A | 7/1997 | Thompson |
| 5,667,896 A | 9/1997 | Carter |
| 5,674,802 A | 10/1997 | Sheppard |
| 5,700,847 A | 12/1997 | Thompson |
| 5,708,045 A | 1/1998 | Thompson |
| 5,718,856 A | 2/1998 | Kinkelaar |
| 5,723,197 A | 3/1998 | Grund |
| 5,763,642 A | 6/1998 | Cai |
| 5,777,175 A | 7/1998 | Ohkubo |
| 5,824,713 A | 10/1998 | Schmitz |
| 5,853,895 A | 12/1998 | Lewno |
| 5,897,168 A | 4/1999 | Bartelt |
| 5,916,994 A | 6/1999 | Izukawa |
| 5,919,493 A | 7/1999 | Sheppard |
| 6,019,411 A | 2/2000 | Carter |
| 6,051,622 A | 4/2000 | Kinkelaar |
| 6,066,683 A * | 5/2000 | Beisner et al. ................ 521/174 |
| 6,068,719 A | 5/2000 | Lewno |

(Continued)

FOREIGN PATENT DOCUMENTS

| | | |
|---|---|---|
| EP | 1080671 | 3/2001 |
| EP | 1544228 | 6/2005 |

(Continued)

OTHER PUBLICATIONS

Sasaki, Takayuki, Novel Polyether Polyol Designed for High Performance Automotive Seating Foams, Reports, Res. Lab. Asahi Glass Co., Ltd., pp. 67-73, vol. 53, 2003 Japan.

(Continued)

*Primary Examiner* — John Cooney
(74) *Attorney, Agent, or Firm* — Fletcher Yoder, P.C.

(57) ABSTRACT

A foam article for use in a seat cushion includes an open cell, polyurethane foam material that includes a base polyol; a crosslinker; an isocyanate; a surfactant; and water, that are reacted together to produce a seat cushion having dynamic and static performance specifications that are better than the performance characteristics for a traditional, high resilient material seat cushion, as well as other seating materials.

8 Claims, 27 Drawing Sheets

(56) References Cited

U.S. PATENT DOCUMENTS

| | | | |
|---|---|---|---|
| 6,113,837 A | 9/2000 | Erickson | |
| 6,127,443 A | 10/2000 | Perry | |
| 6,156,864 A | 12/2000 | Ohkubo | |
| 6,201,035 B1 | 3/2001 | Tuinman | |
| 7,268,170 B2 * | 9/2007 | Anderson et al. | 521/176 |
| 7,825,166 B2 | 11/2010 | Sasaki et al. | |
| 2003/0203182 A1 | 10/2003 | Thompson | |

FOREIGN PATENT DOCUMENTS

| | | |
|---|---|---|
| JP | H02261818 | 10/1990 |
| RU | 2237678 | 10/2004 |
| RU | 2268270 | 1/2006 |
| SU | 365895 | 1/1973 |
| WO | 2004094506 | 11/2004 |

OTHER PUBLICATIONS

Patent Treaty Corporation, International Search Report on Patentability, International Application No. PCT/US2007/089075 Apr. 30, 2008.

Japanese Office Action for JP2009-544295 dated Jun. 24, 2014.

* cited by examiner

| | | | OH# | 23 | 18 | 6233.3 | 1603 | 251 | 560 | 24 | | | Stoich | | | |
|---|---|---|---|---|---|---|---|---|---|---|---|---|---|---|---|---|
| n | Formula | Time to Crush | Control E960 Formulations | 960 | 971 | Total Water | DEOA (neat) | A-1 | 33-LV | 5164 | 5169 | 100 Index : ISO Ratio | Poly:TDI Ratio | Estimated Density | Percent Solid |
| 1 | A-A | 2 min | TDI 2.3 | 70.00 | 30.00 | 2.30 | 1.50 | 0.10 | 0.30 | 0.30 | 0.50 | 29.609 | 3.546 | 62 | 10.8 |
| 2 | A | 30 sec | TDI 2.3 | 70.00 | 30.00 | 2.30 | 1.50 | 0.10 | 0.30 | 0.30 | 0.50 | 29.609 | 3.546 | 62 | 10.8 |
| 3 | A | 45 sec | TDI 2.3 | 70.00 | 30.00 | 2.30 | 1.50 | 0.10 | 0.30 | 0.30 | 0.50 | 29.609 | 3.546 | 62 | 10.8 |
| 4 | A | 3 min | TDI 2.3 | 70.00 | 30.00 | 2.30 | 1.50 | 0.10 | 0.30 | 0.30 | 0.50 | 29.609 | 3.546 | 62 | 10.8 |
| 5 | A | 4 min | TDI 2.3 | 70.00 | 30.00 | 2.30 | 1.50 | 0.10 | 0.30 | 0.30 | 0.50 | 29.609 | 3.546 | 62 | 10.8 |
| 6 | B-B | 2 min | TDI 2.5 | 50.00 | 50.00 | 2.50 | 1.50 | 0.10 | 0.30 | 0.30 | 0.50 | 31.387 | 3.352 | 58 | 18.0 |
| 7 | B | 30 sec | TDI 2.5 | 50.00 | 50.00 | 2.50 | 1.50 | 0.10 | 0.30 | 0.30 | 0.50 | 31.387 | 3.352 | 58 | 18.0 |
| 8 | B | 45 sec | TDI 2.5 | 50.00 | 50.00 | 2.50 | 1.50 | 0.10 | 0.30 | 0.30 | 0.50 | 31.387 | 3.352 | 58 | 18.0 |
| 9 | B | 3 min | TDI 2.5 | 50.00 | 50.00 | 2.50 | 1.50 | 0.10 | 0.30 | 0.30 | 0.50 | 31.387 | 3.352 | 58 | 18.0 |
| 10 | B | 4 min | TDI 2.5 | 50.00 | 50.00 | 2.50 | 1.50 | 0.10 | 0.30 | 0.30 | 0.50 | 31.387 | 3.352 | 58 | 18.0 |
| 11 | C | 2 min | TM20 2.3-1 | 70.00 | 30.00 | 2.30 | 0.00 | 0.12 | 0.35 | 0.50 | 0.50 | 28.019 | 3.704 | 62 | 10.8 |
| 12 | D | 30 sec | TM20 2.3-2 | 70.00 | 30.00 | 2.30 | 0.00 | 0.12 | 0.35 | 0.75 | 0.50 | 28.029 | 3.711 | 62 | 10.8 |
| 13 | D | 45 sec | TM20 2.3-2 | 70.00 | 30.00 | 2.30 | 0.00 | 0.12 | 0.35 | 0.75 | 0.50 | 28.029 | 3.711 | 62 | 10.8 |
| 14 | E | 3 min | TM20 2.3-3 | 70.00 | 30.00 | 2.30 | 0.00 | 0.12 | 0.35 | 0.35 | 0.50 | 28.013 | 3.699 | 62 | 10.8 |
| 15 | E | 4 min | TM20 2.3-3 | 70.00 | 30.00 | 2.30 | 0.00 | 0.12 | 0.35 | 0.35 | 0.50 | 28.013 | 3.699 | 62 | 10.8 |
| 16 | F | 2 min | TM20 2.5-1 | 50.00 | 50.00 | 2.50 | 0.00 | 0.12 | 0.35 | 0.50 | 0.50 | 29.940 | 3.473 | 58 | 18.0 |
| 17 | G | 30 sec | TM20 2.5-2 | 50.00 | 50.00 | 2.50 | 0.00 | 0.12 | 0.35 | 0.75 | 0.50 | 29.950 | 3.480 | 58 | 18.0 |
| 18 | G | 45 sec | TM20 2.5-2 | 50.00 | 50.00 | 2.50 | 0.00 | 0.12 | 0.35 | 0.75 | 0.50 | 29.950 | 3.480 | 58 | 18.0 |
| 19 | H | 3 min | TM20 2.5-3 | 50.00 | 50.00 | 2.50 | 0.00 | 0.12 | 0.35 | 0.35 | 0.50 | 29.934 | 3.468 | 58 | 18.0 |
| 20 | H | 4 min | TM20 2.5-3 | 50.00 | 50.00 | 2.50 | 0.00 | 0.12 | 0.35 | 0.35 | 0.50 | 29.934 | 3.468 | 58 | 18.0 |

FIG - 4A

| | | Toyota 25%/50% ILD-Firmness | | | SCO B Hysteresis | | | | Stress Relaxation | | Transmissibility - Constant Acceleration | | | | |
|---|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Nat Freq (Hz) | Peak Transmiss | Attenu Freq (Hz) | Transmiss at 6 Hz | Comfort Number |
| 1 | 1035 | 97.25 | 280.24 | 508.85 | 233.85 | 270.52 | 308.72 | 17.09 | 178.74 | 8.81 | 3.10 | 5.99 | 4.34 | 0.39 | 18.57 |
| 2 | 1037 | 96.62 | 280.15 | 490.98 | 230.10 | 266.07 | 303.24 | 17.17 | 178.98 | 8.68 | 3.10 | 7.48 | 4.28 | 0.42 | 23.19 |
| 3 | 1049 | 97.44 | 297.75 | 517.87 | 243.04 | 281.00 | 320.24 | 17.57 | 177.61 | 9.38 | 3.15 | 8.11 | 4.35 | 0.39 | 25.55 |
| 4 | 1034 | 96.88 | 265.35 | 455.99 | 217.23 | 251.15 | 286.29 | 17.52 | 178.39 | 8.99 | 2.90 | 5.12 | 4.22 | 0.36 | 14.85 |
| 5 | 1054 | 97.40 | 296.14 | 515.92 | 241.98 | 279.73 | 318.90 | 17.78 | 178.13 | 9.12 | 3.18 | 6.97 | 4.39 | 0.41 | 22.16 |
| 6 | 954 | 98.09 | 293.30 | 513.50 | 237.81 | 275.51 | 314.75 | 17.51 | 171.99 | 9.12 | 3.14 | 4.11 | 4.79 | 0.50 | 12.91 |
| 7 | 960 | 97.52 | 301.90 | 534.54 | 245.79 | 286.74 | 328.39 | 21.49 | 172.75 | 11.86 | 3.19 | 4.61 | 4.87 | 0.58 | 14.71 |
| 8 | 967 | 97.70 | 287.28 | 506.42 | 233.26 | 271.22 | 310.75 | 21.07 | 174.08 | 11.18 | 3.04 | 3.61 | 4.66 | 0.53 | 10.97 |
| 9 | 955 | 97.87 | 301.42 | 533.89 | 246.54 | 286.02 | 326.89 | 21.72 | 172.72 | 11.68 | 3.24 | 4.78 | 4.71 | 0.47 | 15.49 |
| 10 | 983 | 98.26 | 298.87 | 527.76 | 246.07 | 283.97 | 323.59 | 21.11 | 173.07 | 11.70 | 3.15 | 4.58 | 4.66 | 0.43 | 14.43 |
| 11 | 1030 | 97.40 | 268.71 | 455.06 | 219.21 | 252.77 | 287.30 | 19.30 | 176.40 | 10.00 | 2.91 | 3.75 | 4.34 | 0.41 | 10.91 |
| 12 | 1032 | 95.43 | 246.33 | 427.56 | 201.55 | 234.14 | 267.67 | 18.83 | 179.39 | 8.47 | 2.90 | 3.91 | 4.38 | 0.40 | 11.34 |
| 13 | 1040 | 97.28 | 282.29 | 478.69 | 230.89 | 266.10 | 302.45 | 19.43 | 176.89 | 9.75 | 3.04 | 5.36 | 4.44 | 0.42 | 16.29 |
| 14 | 1047 | 97.47 | 272.79 | 478.23 | 225.02 | 260.16 | 296.59 | 19.91 | 175.27 | 10.68 | 3.10 | 4.44 | 4.54 | 0.47 | 13.76 |
| 15 | 1041 | 98.03 | 266.82 | 464.20 | 218.96 | 252.58 | 287.43 | 19.85 | 175.35 | 10.53 | 3.00 | 4.04 | 4.37 | 0.41 | 12.12 |
| 16 | 975 | 97.60 | 265.48 | 469.89 | 219.11 | 254.18 | 291.17 | 23.33 | 172.12 | 12.18 | 3.24 | 2.62 | 5.03 | 0.62 | 8.49 |
| 17 | 959 | 97.79 | 304.48 | 528.59 | 249.93 | 291.02 | 333.11 | 23.41 | 170.47 | 13.02 | 3.30 | 3.64 | 5.05 | 0.63 | 12.01 |
| 18 | 955 | 97.74 | 289.81 | 511.14 | 238.11 | 276.46 | 316.58 | 23.30 | 169.80 | 13.37 | 3.23 | 3.73 | 4.88 | 0.55 | 12.05 |
| 19 | 979 | 97.99 | 307.47 | 546.91 | 254.44 | 296.21 | 339.56 | 24.12 | 168.88 | 13.84 | 3.32 | 3.76 | 4.99 | 0.56 | 12.48 |
| 20 | 970 | 98.10 | 307.57 | 540.13 | 253.91 | 294.00 | 335.79 | 24.35 | 166.61 | 15.00 | 3.28 | 4.03 | 5.13 | 0.62 | 13.22 |

FIG - 4B

| | Transmissibility - Constant Displacement | | | | | | | | | Microforce Displacement | | | | | |
|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 1 | 3.47 | 1.25 | 3.64 | 0.34 | 296.87 | 808.66 | 7.51 | 12.73 | 31.80 | 3.62 | 10.41 | 37.13 | 25.23 | 9.11 | 11.74 | 15.65 |
| 2 | 3.42 | 1.25 | 3.59 | 0.34 | 287.96 | 782.90 | 7.09 | 12.48 | 30.72 | 3.75 | 11.31 | 38.62 | 23.65 | 8.71 | 11.79 | 15.83 |
| 3 | 3.53 | 1.31 | 3.70 | 0.32 | 304.44 | 826.99 | 7.61 | 13.21 | 32.29 | 3.70 | 9.92 | 36.04 | 26.34 | 9.77 | 11.86 | 16.17 |
| 4 | 3.41 | 1.09 | 3.53 | 0.28 | 272.14 | 717.21 | 6.92 | 11.00 | 27.33 | 4.20 | 12.96 | 41.48 | 20.25 | 8.07 | 11.83 | 16.24 |
| 5 | 3.49 | 1.30 | 3.69 | 0.34 | 302.33 | 825.39 | 7.56 | 13.24 | 32.19 | 3.78 | 10.05 | 36.27 | 26.22 | 9.60 | 11.96 | 16.31 |
| 6 | 3.86 | 1.28 | 4.15 | 0.41 | 302.41 | 822.73 | 7.47 | 12.91 | 31.53 | 3.40 | 10.01 | 36.18 | 27.33 | 9.77 | 13.07 | 19.97 |
| 7 | 3.84 | 1.34 | 4.19 | 0.50 | 310.71 | 854.18 | 7.98 | 13.79 | 32.94 | 3.35 | 9.60 | 34.77 | 27.39 | 10.30 | 13.28 | 19.83 |
| 8 | 3.75 | 1.10 | 3.94 | 0.40 | 295.01 | 812.22 | 7.67 | 12.88 | 31.11 | 3.54 | 11.08 | 37.04 | 24.14 | 9.59 | 13.01 | 19.49 |
| 9 | 3.82 | 1.33 | 4.14 | 0.39 | 310.27 | 868.79 | 7.94 | 13.89 | 34.72 | 3.37 | 9.65 | 34.97 | 28.26 | 10.40 | 13.35 | 20.06 |
| 10 | 3.78 | 1.30 | 4.11 | 0.41 | 307.71 | 858.21 | 7.59 | 13.75 | 33.64 | 3.47 | 9.31 | 35.39 | 29.90 | 9.89 | 13.18 | 19.62 |
| 11 | 4.17 | 1.13 | 4.35 | 0.38 | 274.55 | 713.60 | 6.54 | 10.92 | 26.72 | 4.20 | 12.57 | 41.40 | 21.35 | 8.10 | 11.82 | 17.77 |
| 12 | 3.56 | 1.00 | 3.57 | 0.32 | 253.12 | 684.01 | 6.47 | 10.87 | 27.86 | 4.58 | 15.50 | 44.58 | 16.10 | 7.59 | 12.41 | 17.21 |
| 13 | 3.58 | 1.27 | 3.81 | 0.38 | 289.97 | 750.85 | 6.96 | 11.51 | 28.02 | 3.56 | 10.74 | 38.79 | 23.87 | 8.69 | 11.78 | 18.00 |
| 14 | 3.58 | 1.15 | 3.79 | 0.37 | 282.44 | 773.25 | 7.08 | 12.18 | 31.15 | 3.88 | 11.80 | 39.50 | 23.16 | 8.55 | 12.44 | 18.29 |
| 15 | 4.83 | 1.12 | 4.98 | 0.46 | 275.75 | 749.69 | 6.53 | 11.80 | 30.20 | 3.86 | 12.38 | 40.76 | 22.64 | 8.17 | 12.31 | 18.20 |
| 16 | 4.08 | 0.98 | 4.11 | 0.52 | 278.74 | 766.82 | 7.16 | 12.31 | 30.94 | 3.78 | 12.65 | 39.99 | 21.17 | 8.82 | 13.58 | 21.35 |
| 17 | 4.02 | 1.28 | 4.43 | 0.58 | 315.23 | 854.96 | 8.05 | 13.17 | 34.28 | 3.54 | 9.51 | 34.33 | 27.40 | 10.98 | 13.47 | 21.70 |
| 18 | 4.32 | 1.21 | 4.67 | 0.51 | 303.89 | 825.54 | 7.56 | 12.98 | 32.60 | 3.56 | 10.29 | 36.28 | 25.82 | 9.95 | 13.56 | 21.54 |
| 19 | 4.08 | 1.26 | 4.49 | 0.51 | 321.18 | 900.92 | 8.41 | 14.22 | 36.98 | 3.46 | 9.11 | 33.27 | 28.90 | 11.32 | 14.24 | 22.41 |
| 20 | 5.12 | 1.48 | 5.71 | 0.85 | 320.36 | 888.78 | 8.19 | 13.99 | 35.99 | 3.18 | 8.38 | 33.59 | 32.20 | 10.97 | 14.20 | 22.57 |

FIG - 4C

| | | Formulation Details - PPHP | | | | | | Process Details (Hand Pour) | | | | Products Using Formulation | | | | | | Consider to be se |
|---|---|---|---|---|---|---|---|---|---|---|---|---|---|---|---|---|---|---|
| n | Formula | Base Polyol | Copolymer Polyol | Water | Cross-linker | Catalyst | Surfactant | Isocyanate (100 Index) | Cure | TPR | Time to Crush | n | Seat Foam | Head-rest | Arm-rest | IP | OH | Visor | Door | Carpet | Other |
| 1 | A | 70.00 | 30.00 | 2.30 | 1.50 | 0.40 | 0.80 | TDI | 4 min | 2 min | 2 min | 1 | x | | | | | | | | |
| 2 | A | 70.00 | 30.00 | 2.30 | 1.50 | 0.40 | 0.80 | TDI | 4 min | 2 min | 30 sec | 2 | x | | | | | | | | |
| 3 | A | 70.00 | 30.00 | 2.30 | 1.50 | 0.40 | 0.80 | TDI | 4 min | 2 min | 45 sec | 3 | x | | | | | | | | |
| 4 | A | 70.00 | 30.00 | 2.30 | 1.50 | 0.40 | 0.80 | TDI | 4 min | 2 min | 3 min | 4 | x | | | | | | | | |
| 5 | A | 70.00 | 30.00 | 2.30 | 1.50 | 0.40 | 0.80 | TDI | 4 min | 2 min | 4 min | 5 | x | | | | | | | | |
| 6 | B | 50.00 | 50.00 | 2.50 | 1.50 | 0.40 | 0.80 | TDI | 4 min | 2 min | 2 min | 6 | x | | | | | | | | |
| 7 | B | 50.00 | 50.00 | 2.50 | 1.50 | 0.40 | 0.80 | TDI | 4 min | 2 min | 30 sec | 7 | x | | | | | | | | |
| 8 | B | 50.00 | 50.00 | 2.50 | 1.50 | 0.40 | 0.80 | TDI | 4 min | 2 min | 45 sec | 8 | x | | | | | | | | |
| 9 | B | 50.00 | 50.00 | 2.50 | 1.50 | 0.40 | 0.80 | TDI | 4 min | 2 min | 3 min | 9 | x | | | | | | | | |
| 10 | B | 50.00 | 50.00 | 2.50 | 1.50 | 0.40 | 0.80 | TDI | 4 min | 2 min | 4 min | 10 | x | | | | | | | | |
| 11 | C | 70.00 | 30.00 | 2.30 | 0.00 | 0.47 | 1.00 | TM20 | 4 min | 2 min | 2 min | 11 | x | | | | | | | | |
| 12 | D | 70.00 | 30.00 | 2.30 | 0.00 | 0.47 | 1.25 | TM20 | 4 min | 2 min | 30 sec | 12 | x | | | | | | | | |
| 13 | D | 70.00 | 30.00 | 2.30 | 0.00 | 0.47 | 1.25 | TM20 | 4 min | 2 min | 45 sec | 13 | x | | | | | | | | |
| 14 | E | 70.00 | 30.00 | 2.30 | 0.00 | 0.47 | 0.85 | TM20 | 4 min | 2 min | 3 min | 14 | x | | | | | | | | |
| 15 | E | 70.00 | 30.00 | 2.30 | 0.00 | 0.47 | 0.85 | TM20 | 4 min | 2 min | 4 min | 15 | x | | | | | | | | |
| 16 | F | 50.00 | 50.00 | 2.50 | 0.00 | 0.47 | 1.00 | TM20 | 4 min | 2 min | 2 min | 16 | x | | | | | | | | |
| 17 | G | 50.00 | 50.00 | 2.50 | 0.00 | 0.47 | 1.25 | TM20 | 4 min | 2 min | 30 sec | 17 | x | | | | | | | | |
| 18 | G | 50.00 | 50.00 | 2.50 | 0.00 | 0.47 | 1.25 | TM20 | 4 min | 2 min | 45 sec | 18 | x | | | | | | | | |
| 19 | H | 50.00 | 50.00 | 2.50 | 0.00 | 0.47 | 0.85 | TM20 | 4 min | 2 min | 3 min | 19 | x | | | | | | | | |
| 20 | H | 50.00 | 50.00 | 2.50 | 0.00 | 0.47 | 0.85 | TM20 | 4 min | 2 min | 4 min | 20 | x | | | | | | | | |

FIG - 4D

| n | Formula | Time to Crush | Tianjin Polyol | OH# 23 | TPOP05-45 19.5 | Total Water 6233.3 | DEOA (neat) 1603 | A-1 251 | 33-LV 560 | 5164 24 | 5169 | ISO | Poly:TDI Ratio | Estimated Density | Percent Solid |
|---|---|---|---|---|---|---|---|---|---|---|---|---|---|---|---|
| 21 | I-C | 2 min | TDI 2,3-T | 76.00 | 24.00 | 2.30 | 1.50 | 0.11 | 0.33 | 0.30 | 0.50 | 29,741 | 3.532 | 62 | 10.8 |
| 22 | J-D | 2 min | TDI 2,5-T | 60.00 | 40.00 | 2.50 | 1.50 | 0.11 | 0.33 | 0.30 | 0.50 | 31,588 | 3.332 | 58 | 18.0 |
| 23 | K | 2 min | TM20 2,3-T | 76.00 | 24.00 | 2.30 | 0.00 | 0.13 | 0.39 | 0.50 | 0.50 | 28,168 | 3.686 | 62 | 10.8 |
| 24 | L | 2 min | TM20 2,5-T | 60.00 | 40.00 | 2.50 | 0.00 | 0.13 | 0.39 | 0.50 | 0.50 | 30,162 | 3.449 | 58 | 18.0 |

| n | Formula | Time to Crush | Korean Polyol | OH# 23 | KE880S 20 | Total Water 6233.3 | DEOA (neat) 1603 | A-1 251 | 33-LV 560 | 5164 24 | 5169 | ISO | Poly:TDI Ratio | Estimated Density | Percent Solid |
|---|---|---|---|---|---|---|---|---|---|---|---|---|---|---|---|
| 25 | M-E | 2 min | TDI 2,3-K | 74.29 | 25.71 | 2.30 | 1.50 | 0.10 | 0.30 | 0.30 | 0.50 | 29,722 | 3.533 | 62 | 10.8 |
| 26 | N-F | 2 min | TDI 2,5-K | 57.14 | 42.86 | 2.50 | 1.50 | 0.10 | 0.30 | 0.50 | 0.50 | 31,576 | 3.332 | 58 | 18.0 |
| 27 | O | 2 min | TM20 2,3-K | 74.29 | 25.71 | 2.30 | 0.00 | 0.12 | 0.35 | 0.50 | 0.50 | 28,141 | 3.687 | 62 | 10.8 |
| 28 | P | 2 min | TM20 2,5-K | 57.14 | 42.86 | 2.50 | 0.00 | 0.12 | 0.35 | 0.50 | 0.50 | 30,144 | 3.449 | 58 | 18.0 |

FIG - 4F

| | | Toyota 25%/50% | | SCO B Hysteresis | | | | Stress Relaxation | | Transmissibility - Constant Acceleration | | | | |
|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Nat Freq (Hz) | Peak Transmiss | Attenu Freq (Hz) | Transmiss at 6Hz | Comfort Number |
| 21 | 1040 | 96.85 | 274.31 | 484.92 | 220.05 | 254.74 | 291.25 | 16.97 | 179.92 | 8.21 | 3.05 | 6.12 | 4.19 | 0.41 | 18.67 |
| 22 | 968 | 97.18 | 329.12 | 589.40 | 267.98 | 311.02 | 356.40 | 20.29 | 173.36 | 11.55 | 3.35 | 6.80 | 3.40 | 0.47 | 22.78 |
| 23 | 1040 | 97.13 | 286.36 | 493.05 | 235.33 | 271.18 | 308.62 | 19.33 | 174.83 | 10.80 | 3.18 | 7.26 | 4.46 | 0.48 | 22.94 |
| 24 | 988 | 97.28 | 316.17 | 563.96 | 261.59 | 302.07 | 346.30 | 21.47 | 173.00 | 11.73 | 3.38 | 4.96 | 4.88 | 0.51 | 16.57 |

| | | Toyota 25%/50% | | SCO B Hysteresis | | | | Stress Relaxation | | Transmissibility - Constant Acceleration | | | | |
|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Nat Freq (Hz) | Peak Transmiss | Attenu Freq (Hz) | Transmiss at 6Hz | Comfort Number |
| 25 | 1051 | 96.19 | 300.69 | 527.20 | 240.26 | 277.27 | 315.52 | 17.49 | 177.56 | 9.41 | 3.13 | 8.83 | 4.40 | 0.42 | 27.84 |
| 26 | 977 | 97.00 | 328.62 | 588.98 | 262.35 | 305.01 | 351.50 | 21.42 | 172.79 | 11.84 | 3.40 | 6.62 | 5.01 | 0.62 | 22.51 |
| 27 | 1037 | 96.69 | 290.01 | 506.38 | 239.75 | 276.69 | 315.58 | 19.85 | 174.40 | 11.02 | 3.19 | 7.09 | 4.55 | 0.43 | 22.62 |
| 28 | 974 | 97.60 | 335.08 | 596.35 | 276.92 | 321.36 | 368.51 | 23.63 | 168.69 | 13.94 | 3.51 | 4.97 | 5.23 | 0.67 | 17.44 |

FIG - 4G

| | Transmissibility - Constant Displacement | | | | | | | Microforce Displacement | | | | | | | |
|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 21 | 3.47 | 1.20 | 3.64 | 0.26 | 277.82 | 769.93 | 7.07 | 12.27 | 30.90 | 3.91 | 12.29 | 39.92 | 22.08 | 8.09 | 11.94 | 15.54 |
| 22 | 3.86 | 1.51 | 4.24 | 0.42 | 335.36 | 948.14 | 8.78 | 15.31 | 38.43 | 3.42 | 8.08 | 31.39 | 32.26 | 12.01 | 13.44 | 16.73 |
| 23 | 3.57 | 1.33 | 3.80 | 0.37 | 293.73 | 792.22 | 7.22 | 12.31 | 32.05 | 3.46 | 10.17 | 37.99 | 26.38 | 8.80 | 12.11 | 17.82 |
| 24 | 3.90 | 1.43 | 4.30 | 0.42 | 328.11 | 920.91 | 8.24 | 14.83 | 37.81 | 3.27 | 7.96 | 32.65 | 32.35 | 10.96 | 13.43 | 19.78 |

| | Transmissibility - Constant Displacement | | | | | | | Microforce Displacement | | | | | | | |
|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 25 | 3.52 | 1.35 | 3.71 | 0.35 | 303.82 | 834.27 | 7.49 | 13.19 | 32.91 | 3.57 | 9.79 | 35.16 | 26.56 | 9.40 | 11.75 | 16.39 |
| 26 | 3.91 | 1.58 | 4.39 | 0.47 | 330.83 | 946.64 | 8.86 | 15.54 | 38.75 | 3.60 | 8.83 | 31.89 | 30.23 | 11.97 | 13.73 | 19.63 |
| 27 | 3.65 | 1.43 | 3.96 | 0.39 | 298.99 | 821.94 | 7.43 | 13.04 | 33.95 | 3.33 | 9.90 | 36.99 | 27.09 | 9.17 | 12.52 | 18.22 |
| 28 | 4.11 | 1.59 | 4.74 | 0.58 | 347.39 | 960.72 | 9.08 | 15.64 | 39.88 | 3.27 | 7.29 | 29.91 | 36.10 | 12.83 | 14.39 | 21.92 |

FIG - 4H

| | | Formulation Details - PPHP | | | | | Process Details (Hand Pour) | | | | Products Using Formulation | | | | | | | |
|---|---|---|---|---|---|---|---|---|---|---|---|---|---|---|---|---|---|---|
| n | Formula | Base Polyol | Copolymer Polyol | Water | Cross-linker | Catalyst | Surfactant | Isocyanate (100 Index) | Cure | TPR | Time to Crush | n | Seat Foam | Headrest | Armrest | IP | OH | Visor | Door | Carpet | Other |
| 21 | I | 76.00 | 24.00 | 2.30 | 1.50 | 0.44 | 0.80 | TDI | 4 min | 2 min | 2 min | 21 | x | | | | | | | | |
| 22 | J | 60.00 | 40.00 | 2.50 | 1.50 | 0.44 | 0.80 | TDI | 4 min | 2 min | 2 min | 22 | x | | | | | | | | |
| 23 | K | 76.00 | 24.00 | 2.30 | 0.00 | 0.52 | 1.00 | TM20 | 4 min | 2 min | 2 min | 23 | x | | | | | | | | |
| 24 | L | 60.00 | 40.00 | 2.50 | 0.00 | 0.52 | 1.00 | TM20 | 4 min | 2 min | 2 min | 24 | x | | | | | | | | |

| | | Formulation Details - PPHP | | | | | Process Details (Hand Pour) | | | | Products Using Formulation | | | | | | | |
|---|---|---|---|---|---|---|---|---|---|---|---|---|---|---|---|---|---|---|
| n | Formula | Base Polyol | Copolymer Polyol | Water | Cross-linker | Catalyst | Surfactant | Isocyanate (100 Index) | Cure | TPR | Time to Crush | n | Seat Foam | Headrest | Armrest | IP | OH | Visor | Door | Carpet | Other |
| 25 | M | 74.29 | 25.71 | 2.30 | 1.50 | 0.40 | 0.80 | TDI | 4 min | 2 min | 2 min | 25 | x | | | | | | | | |
| 26 | N | 57.14 | 42.86 | 2.50 | 1.50 | 0.40 | 0.80 | TDI | 4 min | 2 min | 2 min | 26 | x | | | | | | | | |
| 27 | O | 74.29 | 25.71 | 2.30 | 0.00 | 0.47 | 1.00 | TM20 | 4 min | 2 min | 2 min | 27 | x | | | | | | | | |
| 28 | P | 57.14 | 42.86 | 2.50 | 0.00 | 0.47 | 1.00 | TM20 | 4 min | 2 min | 2 min | 28 | x | | | | | | | | |

FIG - 4I

| n | Cost | Damp-ening | Thermal | Lumbar | Durability | Comfort-Static | Comfort-Dynamic | Comfort Number | Recycla bility | Processa bility | Safety | Sustaina bility |
|---|---|---|---|---|---|---|---|---|---|---|---|---|
| | | | | | Relative Performance Characteristics for Formulation | | | | | | | |
| 21 | | △ | | | | △ | | - | | | | |
| 22 | | - | △ | | △ | △ | - | - | △ | △ | △ | |
| 23 | | - | △ | | - | - | - | - | △ | △ | △ | |
| 24 | | - | | | △ | △ | - | - | △ | △ | △ | |

| n | Cost | Damp-ening | Thermal | Lumbar | Durability | Comfort-Static | Comfort-Dynamic | Comfort Number | Recycla bility | Processa bility | Safety | Sustaina bility |
|---|---|---|---|---|---|---|---|---|---|---|---|---|
| | | | | | Relative Performance Characteristics for Formulation | | | | | | | |
| 25 | | - | △ | | △ | △ | - | - | △ | △ | △ | |
| 26 | | - | △ | | △ | - | - | - | △ | △ | △ | |
| 27 | | - | △ | | - | - | - | - | △ | △ | △ | |
| 28 | | | | | △ | - | - | - | △ | △ | △ | |

FIG - 4J

| OH# | | 20 | 19.5 | 8233.3 | 1603 | 251 | 560 | 24 | | | | |
|---|---|---|---|---|---|---|---|---|---|---|---|---|
| n | Formula | Time to Crush | Low Monol Improvement I | X960 | TPOP05-45 | Total Water | DEOA (neat) | A-1 | 33-LV | 5164 | 5169 | ISO | Poly:TDI Ratio | Estimated Density | Percent Solid |
| 29 | Q-Q | 2 min | TDI 2.3-XT | 76.00 | 24.00 | 2.30 | 1.50 | 0.13 | 0.39 | 0.30 | 0.50 | 29,444 | 3.570 | 62 | 10.8 |
| 30 | R-H | 2 min | TDI 2.5-XT | 60.00 | 40.00 | 2.50 | 1.50 | 0.11 | 0.33 | 0.30 | 0.50 | 31,309 | 3.361 | 58 | 18.0 |
| 31 | S | 2 min | TM20 2.3-XT | 76.00 | 24.00 | 2.30 | 0.00 | 0.12 | 0.36 | 0.50 | 0.50 | 27,760 | 3.739 | 62 | 10.8 |
| 32 | T | 2 min | TM20 2.5-XT | 60.00 | 40.00 | 2.50 | 0.00 | 0.12 | 0.36 | 0.50 | 0.50 | 29,832 | 3.495 | 58 | 18.0 |

| OH# | | 17 | 19.5 | 8233.3 | 1603 | 251 | 560 | 24 | | | | |
|---|---|---|---|---|---|---|---|---|---|---|---|---|
| n | Formula | Time to Crush | Low Monol Improvement II | XX960 | TPOP05-45 | Total Water | DEOA (neat) | A-1 | 33-LV | 5164 | 5169 | ISO | Poly:TDI Ratio | Estimated Density | Percent Solid |
| 33 | U | 2 min | TDI 2.3-XXT | 76.00 | 24.00 | 2.30 | 1.50 | 0.13 | 0.40 | 0.30 | 0.50 | 29,100 | 3.613 | 62 | 10.8 |
| 34 | V | 2 min | TDI 2.6-XXT | 60.00 | 40.00 | 2.50 | 1.50 | 0.15 | 0.42 | 0.30 | 0.50 | 31,125 | 3.385 | 58 | 18.0 |
| 35 | W | 2 min | TM20 2.3-XXT | 76.00 | 24.00 | 2.30 | 0.00 | 0.11 | 0.33 | 0.50 | 0.50 | 27,343 | 3.794 | 62 | 10.8 |
| 36 | X | 2 min | TM20 2.5-XXT | 60.00 | 40.00 | 2.50 | 0.00 | 0.11 | 0.33 | 0.50 | 0.50 | 29,498 | 3.524 | 58 | 18.0 |

| OH# | | 20 | 20 | 6233.3 | 1603 | 251 | 560 | 24 | | | | |
|---|---|---|---|---|---|---|---|---|---|---|---|---|
| n | Formula | Time to Crush | Korean Polyol I | X960 | KE880S | Total Water | DEOA (neat) | A-1 | 33-LV | 5164 | 5169 | ISO | Poly:TDI Ratio | Estimated Density | Percent Solid |
| 37 | Y | 2 min | TM20 2.3-XK | 74.29 | 25.71 | 2.30 | 0.00 | 0.12 | 0.35 | 0.50 | 0.50 | 27,768 | 3.737 | 62 | 10.8 |
| 38 | Z | 2 min | TM20 2.5-XK | 57.14 | 42.86 | 2.50 | 0.00 | 0.12 | 0.35 | 0.50 | 0.50 | 29,856 | 3.492 | 58 | 18.0 |
| 39 | AA | 2 min | TDI 2.3-XK | 74.29 | 25.71 | 2.30 | 1.50 | 0.10 | 0.30 | 0.30 | 0.50 | 29,376 | 3.574 | 62 | 10.8 |
| 40 | AB | 2 min | TDI 2.5-XK | 57.14 | 42.86 | 2.50 | 1.50 | 0.10 | 0.30 | 0.30 | 0.50 | 31,310 | 3.360 | 58 | 18.0 |

| | | Toyota 25%/50% | | SCO B Hysteresis | | | | Stress Relaxation | | Transmissibility - Constant Acceleration | | | | |
|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Net Freq (Hz) | Peak Transmiss | Attenu Freq (Hz) | Transmiss at 6Hz | Comfort Number |
| 29 | No Data | No Data | No Data | No Data | No Data | No Data | No Data | No Data | No Data | No Data | No Data | No Data | No Data | No Data | No Data |
| 30 | No Data | No Data | No Data | No Data | No Data | No Data | No Data | No Data | No Data | No Data | No Data | No Data | No Data | No Data | No Data |
| 31 | No Data | No Data | No Data | No Data | No Data | No Data | No Data | No Data | No Data | No Data | No Data | No Data | No Data | No Data | No Data |
| 32 | No Data | No Data | No Data | No Data | No Data | No Data | No Data | No Data | No Data | No Data | No Data | No Data | No Data | No Data | No Data |

| | | Toyota 25%/50% | | SCO B Hysteresis | | | | Stress Relaxation | | Transmissibility - Constant Acceleration | | | | |
|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Net Freq (Hz) | Peak Transmiss | Attenu Freq (Hz) | Transmiss at 6Hz | Comfort Number |
| 33 | No Data | No Data | No Data | No Data | No Data | No Data | No Data | No Data | No Data | No Data | No Data | No Data | No Data | No Data | No Data |
| 34 | No Data | No Data | No Data | No Data | No Data | No Data | No Data | No Data | No Data | No Data | No Data | No Data | No Data | No Data | No Data |
| 35 | No Data | No Data | No Data | No Data | No Data | No Data | No Data | No Data | No Data | No Data | No Data | No Data | No Data | No Data | No Data |
| 36 | No Data | No Data | No Data | No Data | No Data | No Data | No Data | No Data | No Data | No Data | No Data | No Data | No Data | No Data | No Data |

| | | Toyota 25%/50% | | SCO B Hysteresis | | | | Stress Relaxation | | Transmissibility - Constant Acceleration | | | | |
|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Net Freq (Hz) | Peak Transmiss | Attenu Freq (Hz) | Transmiss at 6Hz | Comfort Number |
| 37 | No Data | No Data | No Data | No Data | No Data | No Data | No Data | No Data | No Data | No Data | No Data | No Data | No Data | No Data | No Data |
| 38 | No Data | No Data | No Data | No Data | No Data | No Data | No Data | No Data | No Data | No Data | No Data | No Data | No Data | No Data | No Data |
| 39 | No Data | No Data | No Data | No Data | No Data | No Data | No Data | No Data | No Data | No Data | No Data | No Data | No Data | No Data | No Data |
| 40 | No Data | No Data | No Data | No Data | No Data | No Data | No Data | No Data | No Data | No Data | No Data | No Data | No Data | No Data | No Data |

| | Transmissibility - Constant Displacement | | | | | | | | | | Microforce Displacement | | | | | | |
|---|---|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 29 | No Data | No Data | No Data | No Data | No Data | No Data | No Data | No Data | No Data | No Data | No Data | No Data | No Data | No Data | No Data | No Data |
| 30 | No Data | No Data | No Data | No Data | No Data | No Data | No Data | No Data | No Data | No Data | No Data | No Data | No Data | No Data | No Data | No Data |
| 31 | No Data | No Data | No Data | No Data | No Data | No Data | No Data | No Data | No Data | No Data | No Data | No Data | No Data | No Data | No Data | No Data |
| 32 | No Data | No Data | No Data | No Data | No Data | No Data | No Data | No Data | No Data | No Data | No Data | No Data | No Data | No Data | No Data | No Data |

| | Transmissibility - Constant Displacement | | | | | | | | | | Microforce Displacement | | | | | | |
|---|---|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 33 | No Data | No Data | No Data | No Data | No Data | No Data | No Data | No Data | No Data | No Data | No Data | No Data | No Data | No Data | No Data | No Data |
| 34 | No Data | No Data | No Data | No Data | No Data | No Data | No Data | No Data | No Data | No Data | No Data | No Data | No Data | No Data | No Data | No Data |
| 35 | No Data | No Data | No Data | No Data | No Data | No Data | No Data | No Data | No Data | No Data | No Data | No Data | No Data | No Data | No Data | No Data |
| 36 | No Data | No Data | No Data | No Data | No Data | No Data | No Data | No Data | No Data | No Data | No Data | No Data | No Data | No Data | No Data | No Data |

| | Transmissibility - Constant Displacement | | | | | | | | | | Microforce Displacement | | | | | | |
|---|---|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 37 | No Data | No Data | No Data | No Data | No Data | No Data | No Data | No Data | No Data | No Data | No Data | No Data | No Data | No Data | No Data | No Data |
| 38 | No Data | No Data | No Data | No Data | No Data | No Data | No Data | No Data | No Data | No Data | No Data | No Data | No Data | No Data | No Data | No Data |
| 39 | No Data | No Data | No Data | No Data | No Data | No Data | No Data | No Data | No Data | No Data | No Data | No Data | No Data | No Data | No Data | No Data |
| 40 | No Data | No Data | No Data | No Data | No Data | No Data | No Data | No Data | No Data | No Data | No Data | No Data | No Data | No Data | No Data | No Data |

FIG - 4M

| n | Formula | Formulation Details - PPHP | | | | | | Process Details (Hand Pour) | | | Products Using Formulation | | | | | | | | |
|---|---|---|---|---|---|---|---|---|---|---|---|---|---|---|---|---|---|---|---|
| | | Base Polyol | Copolymer Polyol | Water | Cross-linker | Catalyst | Surfactant | Isocyanate (100 Index) | Cure | TPR | Time to Crush | Seat Foam | Headrest | Armrest | IP | OH | Visor | Door | Carpet | Other |
| 29 | Q | 76.00 | 24.00 | 2.30 | 1.50 | 0.52 | 0.80 | TDI | | | 2 min | x | | | | | | | | |
| 30 | R | 60.00 | 40.00 | 2.50 | 1.50 | 0.44 | 0.80 | TDI | | | 2 min | x | | | | | | | | |
| 31 | S | 76.00 | 24.00 | 2.30 | 0.00 | 0.48 | 1.00 | TM20 | | | 2 min | x | | | | | | | | |
| 32 | T | 60.00 | 40.00 | 2.50 | 0.00 | 0.48 | 1.00 | TM20 | | | 2 min | x | | | | | | | | |
| 33 | U | 76.00 | 24.00 | 2.30 | 1.50 | 0.53 | 0.80 | TDI | | | 2 min | x | | | | | | | | |
| 34 | V | 60.00 | 40.00 | 2.50 | 1.50 | 0.57 | 0.80 | TDI | | | 2 min | x | | | | | | | | |
| 35 | W | 76.00 | 24.00 | 2.30 | 0.00 | 0.44 | 1.00 | TM20 | | | 2 min | x | | | | | | | | |
| 36 | X | 60.00 | 40.00 | 2.50 | 0.00 | 0.44 | 1.00 | TM20 | | | 2 min | x | | | | | | | | |
| 37 | Y | 74.29 | 25.71 | 2.30 | 0.00 | 0.47 | 1.00 | TDI | | | 2 min | x | | | | | | | | |
| 38 | Z | 57.14 | 42.86 | 2.50 | 0.00 | 0.47 | 1.00 | TDI | | | 2 min | x | | | | | | | | |
| 39 | AA | 74.29 | 25.71 | 2.30 | 1.50 | 0.40 | 0.80 | TM20 | | | 2 min | x | | | | | | | | |
| 40 | AB | 57.14 | 42.86 | 2.50 | 1.50 | 0.40 | 0.80 | TM20 | | | 2 min | x | | | | | | | | |

| n | Cost | Damp-ening | Thermal | Lumbar | Durability | Comfort-Static | Comfort-Dynamic | Comfort Number | Recycla-bility | Processa-bility | Safety | Sustaina-bility |
|---|---|---|---|---|---|---|---|---|---|---|---|---|
| 29 | | | | | | | | | | | | |
| 30 | | | △ | | - | - | - | - | △ | - | △ | |
| 31 | | | △ | | - | - | - | - | △ | - | | |
| 32 | | | △ | | | | | | △ | | △ | |

Relative Performance Characteristics for Formulation

| n | Cost | Damp-ening | Thermal | Lumbar | Durability | Comfort-Static | Comfort-Dynamic | Comfort Number | Recycla-bility | Processa-bility | Safety | Sustaina-bility |
|---|---|---|---|---|---|---|---|---|---|---|---|---|
| 33 | | | △ | | - | - | - | - | △ | - | △ | |
| 34 | | | △ | | - | - | - | - | △ | - | △ | |
| 35 | | | △ | | | | | | △ | | | |
| 36 | | | | | | | | | | | △ | |

Relative Performance Characteristics for Formulation

| n | Cost | Damp-ening | Thermal | Lumbar | Durability | Comfort-Static | Comfort-Dynamic | Comfort Number | Recycla-bility | Processa-bility | Safety | Sustaina-bility |
|---|---|---|---|---|---|---|---|---|---|---|---|---|
| 37 | | | △ | | - | - | - | - | △ | - | △ | |
| 38 | | | △ | | - | - | - | - | △ | - | △ | |
| 39 | | | △ | | | | | | | | | |
| 40 | | | | | | | | | | | △ | | h H2O Back Formulations

| | | | OH# | 23 | 18 | 6233.3 | 1603 | 251 | 560 | 24 | | | | | |
|---|---|---|---|---|---|---|---|---|---|---|---|---|---|---|---|
| n | Formula | Time to Crush | Control Formulations | 960 | 971 | Total Water | DEOA (neat) | A-1 | 33-LV | 5164 | 5169 | ISO | Poly:TDI Ratio | Estimated Density | Percent Solid |
| 41 | AC-A-A | 2 min | TDI 3.2 | 85.00 | 15.00 | 3.20 | 1.50 | 0.05 | 0.30 | 0.20 | 0.50 | 38,403 | 2.754 | 45 | 5.4 |
| 42 | AC | 30 sec | TDI 3.2 | 85.00 | 15.00 | 3.20 | 1.50 | 0.05 | 0.30 | 0.20 | 0.50 | 38,403 | 2.754 | 45 | 5.4 |
| 43 | AC | 45 sec | TDI 3.2 | 85.00 | 15.00 | 3.20 | 1.50 | 0.05 | 0.30 | 0.20 | 0.50 | 38,403 | 2.754 | 45 | 5.4 |
| 44 | AC | 3 min | TDI 3.2 | 85.00 | 15.00 | 3.20 | 1.50 | 0.05 | 0.30 | 0.20 | 0.50 | 38,403 | 2.754 | 45 | 5.4 |
| 45 | AC | 4 min | TDI 3.2 | 85.00 | 15.00 | 3.20 | 1.50 | 0.05 | 0.30 | 0.20 | 0.50 | 38,403 | 2.754 | 45 | 5.4 |
| 46 | AD-A-B | 2 min | TDI 5.5 | 75.00 | 25.00 | 5.50 | 1.50 | 0.05 | 0.30 | 0.30 | 0.50 | 60,564 | 1.786 | 28 | 9.0 |
| 47 | AD | 30 sec | TDI 5.5 | 75.00 | 25.00 | 5.50 | 1.50 | 0.05 | 0.30 | 0.30 | 0.50 | 60,564 | 1.786 | 28 | 9.0 |
| 48 | AD | 45 sec | TDI 5.5 | 75.00 | 25.00 | 5.50 | 1.50 | 0.05 | 0.30 | 0.30 | 0.50 | 60,564 | 1.786 | 28 | 9.0 |
| 49 | AD | 3 min | TDI 5.5 | 75.00 | 25.00 | 5.50 | 1.50 | 0.05 | 0.30 | 0.30 | 0.50 | 60,564 | 1.786 | 28 | 9.0 |
| 50 | AD | 4 min | TDI 5.5 | 75.00 | 25.00 | 5.50 | 1.50 | 0.05 | 0.30 | 0.30 | 0.50 | 60,564 | 1.786 | 28 | 9.0 |
| 51 | AE | 2 min | TM20 3.2-1 | 85.00 | 15.00 | 3.20 | 0.00 | 0.05 | 0.35 | 0.20 | 0.50 | 37,506 | 2.781 | 45 | 5.4 |
| 52 | AF | 30 sec | TM20 3.2-2 | 85.00 | 15.00 | 3.20 | 0.00 | 0.05 | 0.35 | 0.70 | 0.50 | 37,526 | 2.793 | 45 | 5.4 |
| 53 | AF | 45 sec | TM20 3.2-2 | 85.00 | 15.00 | 3.20 | 0.00 | 0.05 | 0.35 | 0.70 | 0.50 | 37,526 | 2.793 | 45 | 5.4 |
| 54 | AF | 3 min | TM20 3.2-3 | 85.00 | 15.00 | 3.20 | 0.00 | 0.05 | 0.35 | 0.40 | 0.50 | 37,514 | 2.786 | 45 | 5.4 |
| 55 | AG | 4 min | TM20 3.2-3 | 85.00 | 15.00 | 3.20 | 0.00 | 0.05 | 0.35 | 0.40 | 0.50 | 37,514 | 2.786 | 45 | 5.4 |
| 56 | AH | 2 min | TM20 5.5-1 | 75.00 | 25.00 | 5.50 | 0.00 | 0.05 | 0.35 | 0.30 | 0.50 | 61,444 | 1.737 | 28 | 9.0 |
| 57 | AI | 30 sec | TM20 5.5-2 | 75.00 | 25.00 | 5.50 | 0.00 | 0.05 | 0.35 | 0.60 | 0.50 | 61,456 | 1.741 | 28 | 9.0 |
| 58 | AI | 45 sec | TM20 5.5-2 | 75.00 | 25.00 | 5.50 | 0.00 | 0.05 | 0.35 | 0.60 | 0.50 | 61,456 | 1.741 | 28 | 9.0 |
| 59 | AJ | 3 min | TM20 5.5-3 | 75.00 | 25.00 | 5.50 | 0.00 | 0.05 | 0.35 | 0.50 | 0.50 | 61,452 | 1.740 | 28 | 9.0 |
| 60 | AJ | 4 min | TM20 5.5-3 | 75.00 | 25.00 | 5.50 | 0.00 | 0.05 | 0.35 | 0.50 | 0.50 | 61,452 | 1.740 | 28 | 9.0 |

FIG - 4P

| n | Toyota 25%/50% | | | SCO B Hysteresis | | | | Stress Relaxation | | Transmissibility - Constant Acceleration | | | | |
|---|---|---|---|---|---|---|---|---|---|---|---|---|---|---|
| | Weight (g) | Height (mm) | Force at 25% (N) | Force at 50% (N) | CPF at 16mm (N) | CPF at 20mm (N) | CPF at 25mm (N) | Hyst Loss (%) | Force at 5 min (N) | 5min Stress Relax | Net Freq (Hz) | Peak Transmiss | Attenu Freq (Hz) | Transmiss at 6Hz | Comfort Number |
| 41 | 770 | 97.22 | 179.27 | 318.00 | 141.98 | 165.99 | 190.80 | 18.41 | 179.49 | 8.42 | 3.06 | 6.85 | 4.70 | 0.54 | 18.21 |
| 42 | 767 | 95.47 | 176.84 | 317.00 | 140.85 | 165.55 | 191.09 | 18.22 | 179.58 | 8.38 | 3.22 | 6.50 | 4.87 | 0.52 | 20.93 |
| 43 | 749 | 95.72 | 172.38 | 309.15 | 137.41 | 161.16 | 185.84 | 18.25 | 179.41 | 8.46 | 3.16 | 5.69 | 4.77 | 0.46 | 17.98 |
| 44 | 752 | 99.21 | 190.98 | 335.79 | 151.63 | 177.16 | 203.45 | 18.44 | 179.41 | 8.46 | 3.00 | 5.71 | 4.42 | 0.47 | 17.13 |
| 45 | 759 | 96.97 | 183.39 | 326.03 | 148.72 | 173.36 | 198.73 | 18.35 | 179.05 | 8.65 | 3.02 | 5.57 | 4.46 | 0.45 | 16.82 |
| 46 | No Data | No Data | No Data | No Data | No Data | No Data | No Data | No Data | No Data | No Data | No Data | No Data | No Data | No Data | No Data |
| 47 | No Data | No Data | No Data | No Data | No Data | No Data | No Data | No Data | No Data | No Data | No Data | No Data | No Data | No Data | No Data |
| 48 | No Data | No Data | No Data | No Data | No Data | No Data | No Data | No Data | No Data | No Data | No Data | No Data | No Data | No Data | No Data |
| 49 | No Data | No Data | No Data | No Data | No Data | No Data | No Data | No Data | No Data | No Data | No Data | No Data | No Data | No Data | No Data |
| 50 | No Data | No Data | No Data | No Data | No Data | No Data | No Data | No Data | No Data | No Data | No Data | No Data | No Data | No Data | No Data |
| 51 | 768 | 98.14 | 210.08 | 365.74 | 170.71 | 197.58 | 225.29 | 21.71 | 174.88 | 10.88 | 3.09 | 6.37 | 4.76 | 0.49 | 19.68 |
| 52 | 769 | 97.18 | 208.51 | 369.48 | 171.19 | 198.57 | 227.07 | 22.14 | 174.79 | 10.82 | 3.09 | 7.79 | 4.86 | 0.54 | 24.07 |
| 53 | 770 | 97.59 | 195.39 | 342.02 | 158.50 | 183.68 | 209.82 | 20.95 | 177.09 | 9.65 | 3.05 | 6.55 | 4.78 | 0.52 | 19.98 |
| 54 | 77 | 97.41 | 201.27 | 358.52 | 165.38 | 191.81 | 219.76 | 21.48 | 175.45 | 10.49 | 3.06 | 6.40 | 4.79 | 0.53 | 19.58 |
| 55 | 764 | 97.46 | 221.58 | 387.54 | 180.16 | 207.86 | 236.76 | 23.33 | 172.78 | 11.85 | 3.12 | 7.85 | 4.87 | 0.55 | 24.49 |
| 56 | No Data | No Data | No Data | No Data | No Data | No Data | No Data | No Data | No Data | No Data | No Data | No Data | No Data | No Data | No Data |
| 57 | No Data | No Data | No Data | No Data | No Data | No Data | No Data | No Data | No Data | No Data | No Data | No Data | No Data | No Data | No Data |
| 58 | No Data | No Data | No Data | No Data | No Data | No Data | No Data | No Data | No Data | No Data | No Data | No Data | No Data | No Data | No Data |
| 59 | No Data | No Data | No Data | No Data | No Data | No Data | No Data | No Data | No Data | No Data | No Data | No Data | No Data | No Data | No Data |
| 60 | No Data | No Data | No Data | No Data | No Data | No Data | No Data | No Data | No Data | No Data | No Data | No Data | No Data | No Data | No Data |

FIG - 4Q

| | Transmissibility - Constant Displacement | | | | | | | | | Microforce Displacement | | | | | | | |
|---|---|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L (98N) (%) | L (196N) (%) | L (392N) (%) | K(49-147N) (N/mm) | K(147-441N) (N/mm) | K(343-441N) (N/mm) | Hysteresis (%) |
| 41 | 3.59 | 1.20 | 3.81 | 0.42 | 183.50 | 497.06 | 4.87 | 7.95 | 18.27 | 6.91 | 27.63 | 57.27 | 7.02 | 6.11 | 15.43 | 16.80 |
| 42 | 3.61 | 1.31 | 3.88 | 0.37 | 180.86 | 500.31 | 4.95 | 8.38 | 19.09 | 7.69 | 28.19 | 57.17 | 7.00 | 6.25 | 16.04 | 16.65 |
| 43 | 3.66 | 1.24 | 3.90 | 0.34 | 176.63 | 492.12 | 4.80 | 8.25 | 19.27 | 7.87 | 29.18 | 58.01 | 6.66 | 6.17 | 16.44 | 16.61 |
| 44 | 3.52 | 1.19 | 3.76 | 0.36 | 192.01 | 510.63 | 5.02 | 8.17 | 19.10 | 6.91 | 25.84 | 56.12 | 8.12 | 6.28 | 14.89 | 16.75 |
| 45 | 3.65 | 1.23 | 3.90 | 0.35 | 188.47 | 486.74 | 4.89 | 7.51 | 17.41 | 6.44 | 26.80 | 57.68 | 7.53 | 6.09 | 14.94 | 16.76 |
| 46 | No Data | No Data | No Data | No Data | No Data | No Data | No Data | No Data | No Data | No Data | No Data | No Data | No Data | No Data | No Data | No Data |
| 47 | No Data | No Data | No Data | No Data | No Data | No Data | No Data | No Data | No Data | No Data | No Data | No Data | No Data | No Data | No Data | No Data |
| 48 | No Data | No Data | No Data | No Data | No Data | No Data | No Data | No Data | No Data | No Data | No Data | No Data | No Data | No Data | No Data | No Data |
| 49 | No Data | No Data | No Data | No Data | No Data | No Data | No Data | No Data | No Data | No Data | No Data | No Data | No Data | No Data | No Data | No Data |
| 50 | No Data | No Data | No Data | No Data | No Data | No Data | No Data | No Data | No Data | No Data | No Data | No Data | No Data | No Data | No Data | No Data |
| 51 | 3.73 | 1.35 | 4.01 | 0.39 | 216.44 | 572.51 | 5.30 | 8.98 | 21.36 | 4.92 | 21.18 | 51.81 | 10.25 | 6.84 | 14.68 | 19.85 |
| 52 | 3.74 | 1.55 | 4.18 | 0.43 | 215.61 | 585.78 | 5.44 | 9.47 | 22.33 | 5.01 | 21.19 | 51.16 | 10.34 | 7.02 | 15.16 | 20.23 |
| 53 | 3.72 | 1.39 | 4.04 | 0.42 | 200.01 | 535.40 | 5.00 | 8.55 | 20.35 | 5.69 | 24.17 | 54.64 | 8.59 | 6.47 | 15.37 | 19.08 |
| 54 | 3.69 | 1.40 | 4.11 | 0.43 | 208.35 | 567.35 | 5.33 | 9.14 | 21.30 | 4.96 | 22.58 | 52.33 | 9.24 | 6.86 | 15.14 | 19.63 |
| 55 | 3.80 | 1.59 | 4.27 | 0.48 | 224.93 | 604.98 | 5.44 | 9.82 | 23.00 | 4.44 | 19.44 | 49.83 | 11.82 | 7.27 | 15.26 | 21.42 |
| 56 | No Data | No Data | No Data | No Data | No Data | No Data | No Data | No Data | No Data | No Data | No Data | No Data | No Data | No Data | No Data | No Data |
| 57 | No Data | No Data | No Data | No Data | No Data | No Data | No Data | No Data | No Data | No Data | No Data | No Data | No Data | No Data | No Data | No Data |
| 58 | No Data | No Data | No Data | No Data | No Data | No Data | No Data | No Data | No Data | No Data | No Data | No Data | No Data | No Data | No Data | No Data |
| 59 | No Data | No Data | No Data | No Data | No Data | No Data | No Data | No Data | No Data | No Data | No Data | No Data | No Data | No Data | No Data | No Data |
| 60 | No Data | No Data | No Data | No Data | No Data | No Data | No Data | No Data | No Data | No Data | No Data | No Data | No Data | No Data | No Data | No Data |

FIG - 4R

| | | Formulation Details - PPHP | | | | | | Process Details (Hand Pour) | | | | Products Using Formulation | | | | | | | |
|---|---|---|---|---|---|---|---|---|---|---|---|---|---|---|---|---|---|---|---|
| n | Formula | Base Polyol | Copolymer Polyol | Water | Cross-linker | Catalyst | Surfactant | Isocyanate (100 index) | Cure | TPR | Time to Crush | n | Seat Foam | Headrest | Armrest | IP | OH | Visor | Door | Carpet | Other |
| 41 | AC | 85.00 | 15.00 | 3.20 | 1.50 | 0.35 | 0.70 | TDI | 6 min | 4 min | 2 min | 41 | x | | | | | | | | |
| 42 | AC | 85.00 | 15.00 | 3.20 | 1.50 | 0.35 | 0.70 | TDI | 6 min | 4 min | 30 sec | 42 | x | | | | | | | | |
| 43 | AC | 85.00 | 15.00 | 3.20 | 1.50 | 0.35 | 0.70 | TDI | 6 min | 4 min | 45 sec | 43 | x | | | | | | | | |
| 44 | AC | 85.00 | 15.00 | 3.20 | 1.50 | 0.35 | 0.70 | TDI | 6 min | 4 min | 3 min | 44 | x | | | | | | | | |
| 45 | AC | 85.00 | 15.00 | 3.20 | 1.50 | 0.35 | 0.70 | TDI | 6 min | 4 min | 4 min | 45 | x | | | | | | | | |
| 46 | AD | 75.00 | 25.00 | 5.50 | 1.50 | 0.35 | 0.80 | TDI | | | 2 min | 46 | x | | | | | | | | |
| 47 | AD | 75.00 | 25.00 | 5.50 | 1.50 | 0.35 | 0.80 | TDI | | | 30 sec | 47 | x | | | | | | | | |
| 48 | AD | 75.00 | 25.00 | 5.50 | 1.50 | 0.35 | 0.80 | TDI | | | 45 sec | 48 | x | | | | | | | | |
| 49 | AD | 75.00 | 25.00 | 5.50 | 1.50 | 0.35 | 0.90 | TDI | | | 3 min | 49 | x | | | | | | | | |
| 50 | AE | 75.00 | 25.00 | 5.50 | 1.50 | 0.35 | 0.80 | TDI | | | 4 min | 50 | x | | | | | | | | |
| 51 | AF | 85.00 | 15.00 | 3.20 | 0.00 | 0.41 | 0.70 | TM20 | 6 min | 4 min | 2 min | 51 | x | | | | | | | | |
| 52 | AF | 85.00 | 15.00 | 3.20 | 0.00 | 0.41 | 1.20 | TM20 | 6 min | 4 min | 30 sec | 52 | x | | | | | | | | |
| 53 | AF | 85.00 | 15.00 | 3.20 | 0.00 | 0.41 | 1.20 | TM20 | 6 min | 4 min | 45 sec | 53 | x | | | | | | | | |
| 54 | AG | 85.00 | 15.00 | 3.20 | 0.00 | 0.41 | 0.90 | TM20 | 6 min | 4 min | 3 min | 54 | x | | | | | | | | |
| 55 | AG | 85.00 | 15.00 | 3.20 | 0.00 | 0.41 | 0.90 | TM20 | 6 min | 4 min | 4 min | 55 | x | | | | | | | | |
| 56 | AH | 75.00 | 25.00 | 5.50 | 0.00 | 0.41 | 0.80 | TM20 | | | 2 min | 56 | x | | | | | | | | |
| 57 | AI | 75.00 | 25.00 | 5.50 | 0.00 | 0.41 | 1.10 | TM20 | | | 30 sec | 57 | x | | | | | | | | |
| 58 | AI | 75.00 | 25.00 | 5.50 | 0.00 | 0.41 | 1.10 | TM20 | | | 45 sec | 58 | x | | | | | | | | |
| 59 | AJ | 75.00 | 25.00 | 5.50 | 0.00 | 0.41 | 1.00 | TM20 | | | 3 min | 59 | x | | | | | | | | |
| 60 | AJ | 75.00 | 25.00 | 5.50 | 0.00 | 0.41 | 1.00 | TM20 | | | 4 min | 60 | x | | | | | | | | |

FIG - 4S

| # | Cost | Damp ening | Thermal | Lumbar | Durability | Comfort-Static | Comfort-Dynamic | Comfort Number | Recycla bility | Processa bility | Safety | Sustaina bility |
|---|---|---|---|---|---|---|---|---|---|---|---|---|
| | * CONTROL | * CONTROL | * CONTROL | * CONTROL | * CONTROL | * CONTROL | * | | * CONTROL | | * CONTROL | * |
| 41 | | | | | | | | | | | △ | |
| 42 | | △ | △ | | △ | △ | △ | − | △ | − | △ | |
| 43 | | △ | △ | | △ | △ | △ | − | △ | + | △ | |
| 44 | | △ | △ | | △ | △ | △ | − | △ | − | △ | |
| 45 | * CONTROL | * CONTROL | * CONTROL | * CONTROL | * CONTROL | * CONTROL | * CONTROL | * | * CONTROL | | * CONTROL | * |
| 46 | | △ | △ | | − | − | − | − | △ | − | △ | |
| 47 | | △ | △ | | − | − | − | − | △ | − | △ | |
| 48 | | △ | △ | | − | − | − | − | △ | − | △ | |
| 49 | △ | △ | △ | | − | − | △ | − | △ | − | △ | |
| 50 | − | △ | △ | | − | − | − | − | △ | − | △ | |
| 51 | △ | △ | △ | | − | − | △ | − | △ | − | △ | |
| 52 | − | △ | △ | | − | − | − | − | △ | − | △ | |
| 53 | | △ | △ | | − | − | − | − | △ | − | △ | |
| 54 | | △ | △ | | − | − | − | − | △ | − | △ | |
| 55 | | △ | △ | | − | − | − | − | △ | − | △ | |
| 56 | | △ | △ | | − | − | − | − | △ | − | △ | |
| 57 | | △ | △ | | − | − | − | − | △ | − | △ | |
| 58 | | △ | △ | | | | | | | | | |

Relative Performance Characteristics for Formulation

FIG - 4T

| n | Formula | Time to Crush | Tianjin Polyol | OH# 23 960 | 19.5 TPOP05-45 | 6233.3 Total Water | 1603 DEOA (neat) | 251 A-1 | 560 33-LV | 24 5164 | 5169 | ISO | Poly:TDI Ratio | Estimated Density | Percent Solid |
|---|---|---|---|---|---|---|---|---|---|---|---|---|---|---|---|
| 61 | AK-A-C | 2 min | TDI 3.2-T | 88.00 | 12.00 | 3.20 | 1.50 | 0.06 | 0.33 | 0.30 | 0.50 | 38,488 | 2.751 | 45 | 5.4 |
| 62 | AL-A-D | 2 min | TDI 5.5-T | 80.00 | 20.00 | 5.50 | 1.50 | 0.06 | 0.33 | 0.30 | 0.50 | 60,679 | 1.783 | 28 | 9.0 |
| 63 | AM | 2 min | TM20 3.2-T | 88.00 | 12.00 | 3.20 | 0.00 | 0.06 | 0.39 | 0.50 | 0.50 | 37,608 | 2.783 | 45 | 5.4 |
| 64 | AN | 2 min | TM20 5.5-T | 80.00 | 20.00 | 5.50 | 0.00 | 0.06 | 0.39 | 0.50 | 0.50 | 61,577 | 1.737 | 28 | 9.0 |

| n | Formula | Time to Crush | Korean Polyol I | OH# 23 960 | 20 KE880S | 6233.3 Total Water | 1603 DEOA (neat) | 251 A-1 | 560 33-LV | 24 5164 | 5169 | ISO | Poly:TDI Ratio | Estimated Density | Percent Solid |
|---|---|---|---|---|---|---|---|---|---|---|---|---|---|---|---|
| 65 | AO | 2 min | TDI 3.2-K | 87.14 | 12.86 | 3.20 | 1.50 | 0.06 | 0.30 | 0.30 | 0.50 | 38,467 | 2.752 | 45 | 5.4 |
| 66 | AP | 2 min | TDI 5.5-K | 78.57 | 21.43 | 5.50 | 1.50 | 0.06 | 0.30 | 0.30 | 0.50 | 60,662 | 1.783 | 28 | 9.0 |
| 67 | AQ | 2 min | TM20 3.2-K | 87.14 | 12.86 | 3.20 | 0.00 | 0.06 | 0.35 | 0.50 | 0.50 | 37,579 | 2.784 | 45 | 5.4 |
| 68 | AR | 2 min | TM20 5.5-K | 78.57 | 21.43 | 5.50 | 0.00 | 0.06 | 0.35 | 0.50 | 0.50 | 61,554 | 1.737 | 28 | 9.0 |

| n | Formula | Time to Crush | Low Monol Improvement III | OH# 28 XXX960 | 19.5 TPOP05-45 | 6233.3 Total Water | 1603 DEOA (neat) | 251 A-1 | 560 33-LV | 24 5164 | 5169 | ISO | Poly:TDI Ratio | Estimated Density | Percent Solid |
|---|---|---|---|---|---|---|---|---|---|---|---|---|---|---|---|
| 69 | AS | 2 min | TDI 3.2-T | 85.00 | 12.00 | 3.20 | 1.50 | 0.07 | 0.33 | 0.25 | 0.50 | 39,040 | 2.634 | 45 | 5.4 |
| 70 | AT | 2 min | TDI 5.5-T | 75.00 | 20.00 | 5.50 | 1.50 | 0.07 | 0.33 | 0.25 | 0.50 | 61,083 | 1.689 | 28 | 9.0 |
| 71 | AU | 2 min | TM20 3.2-T | 85.00 | 12.00 | 3.20 | 0.00 | 0.07 | 0.33 | 0.20 | 0.50 | 38,143 | 2.656 | 45 | 5.4 |
| 72 | AV | 2 min | TM20 5.5-T | 75.00 | 20.00 | 5.50 | 0.00 | 0.07 | 0.33 | 0.20 | 0.50 | 61,954 | 1.640 | 28 | 9.0 |

FIG - 4U

| | | Toyota 25%/50% | | | SCO B Hysteresis | | | | Stress Relaxation | | Transmissibility – Constant Acceleration | | | | |
|---|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Nat Freq (Hz) | Peak Transmiss | Attenu Freq (Hz) | Transmiss at 6Hz | Comfort Number |
| 61 | 751 | 95.10 | 196.84 | 352.29 | 156.11 | 183.17 | 211.28 | 18.16 | 180.28 | 8.02 | 3.06 | 8.30 | 4.53 | 0.45 | 25.40 |
| 62 | No Data | No Data | No Data | No Data | No Data | No Data | No Data | No Data | No Data | No Data | No Data | No Data | No Data | No Data | No Data |
| 63 | 772 | 97.05 | 229.52 | 394.78 | 186.54 | 215.15 | 245.16 | 22.01 | 173.32 | 11.57 | 3.06 | 7.15 | 4.62 | 0.46 | 21.88 |
| 64 | No Data | No Data | No Data | No Data | No Data | No Data | No Data | No Data | No Data | No Data | No Data | No Data | No Data | No Data | No Data |

| | | Toyota 25%/50% | | | SCO B Hysteresis | | | | Stress Relaxation | | Transmissibility – Constant Acceleration | | | | |
|---|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Nat Freq (Hz) | Peak Transmiss | Attenu Freq (Hz) | Transmiss at 6Hz | Comfort Number |
| 65 | 761 | 96.39 | 196.97 | 348.14 | 158.07 | 184.07 | 211.21 | 18.76 | 179.10 | 8.62 | 2.97 | 7.39 | 4.42 | 0.42 | 21.95 |
| 66 | No Data | No Data | No Data | No Data | No Data | No Data | No Data | No Data | No Data | No Data | No Data | No Data | No Data | No Data | No Data |
| 67 | 754 | 97.42 | 228.85 | 393.81 | 188.06 | 216.69 | 245.73 | 23.25 | 172.20 | 12.14 | 3.04 | 6.72 | 4.78 | 0.53 | 20.43 |
| 68 | No Data | No Data | No Data | No Data | No Data | No Data | No Data | No Data | No Data | No Data | No Data | No Data | No Data | No Data | No Data |

| | | Toyota 25%/50% | | | SCO B Hysteresis | | | | Stress Relaxation | | Transmissibility – Constant Acceleration | | | | |
|---|---|---|---|---|---|---|---|---|---|---|---|---|---|---|---|
| n | Weight (g) | Height (mm) | Force at 25% (N) | Force at 50% (N) | CPF at 15mm (N) | CPF at 20mm (N) | CPF at 25mm (N) | Hyst Loss (%) | Force at 5 min (N) | 5min Stress Relax | Nat Freq (Hz) | Peak Transmiss | Attenu Freq (Hz) | Transmiss at 6Hz | Comfort Number |
| 69 | No Data | No Data | No Data | No Data | No Data | No Data | No Data | No Data | No Data | No Data | No Data | No Data | No Data | No Data | No Data |
| 70 | No Data | No Data | No Data | No Data | No Data | No Data | No Data | No Data | No Data | No Data | No Data | No Data | No Data | No Data | No Data |
| 71 | No Data | No Data | No Data | No Data | No Data | No Data | No Data | No Data | No Data | No Data | No Data | No Data | No Data | No Data | No Data |
| 72 | No Data | No Data | No Data | No Data | No Data | No Data | No Data | No Data | No Data | No Data | No Data | No Data | No Data | No Data | No Data |

FIG - 4V

| | Transmissibility – Constant Displacement | | | | | | | | | Microforce Displacement | | | | | | | |
|---|---|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 61 | 3.53 | 1.36 | 3.78 | 0.37 | 197.86 | 542.04 | 5.38 | 8.95 | 20.65 | 6.38 | 24.63 | 54.10 | No Data | 8.47 | 6.59 | 14.74 | 16.50 |
| 62 | No Data | No Data | No Data | No Data | No Data | No Data | No Data | No Data | No Data | No Data | No Data | No Data | No Data | No Data | No Data | No Data | No Data |
| 63 | 3.70 | 1.35 | 3.97 | 0.38 | 232.41 | 600.54 | 5.64 | 9.43 | 21.97 | 4.30 | 18.17 | 49.07 | No Data | 13.53 | 7.34 | 13.84 | 20.19 |
| 64 | No Data | No Data | No Data | No Data | No Data | No Data | No Data | No Data | No Data | No Data | No Data | No Data | No Data | No Data | No Data | No Data | No Data |

| | Transmissibility – Constant Displacement | | | | | | | | | Microforce Displacement | | | | | | | |
|---|---|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 65 | 3.63 | 1.28 | 3.72 | 0.31 | 199.77 | 538.92 | 5.22 | 8.85 | 20.19 | 5.79 | 24.24 | 54.16 | No Data | 8.53 | 6.49 | 14.53 | 17.03 |
| 66 | No Data | No Data | No Data | No Data | No Data | No Data | No Data | No Data | No Data | No Data | No Data | No Data | No Data | No Data | No Data | No Data | No Data |
| 67 | 3.77 | 1.47 | 4.17 | 0.46 | 234.44 | 603.33 | 5.83 | 9.31 | 21.78 | 4.19 | 17.83 | 48.76 | No Data | 14.17 | 7.62 | 14.14 | 21.47 |
| 68 | No Data | No Data | No Data | No Data | No Data | No Data | No Data | No Data | No Data | No Data | No Data | No Data | No Data | No Data | No Data | No Data | No Data |

| | Transmissibility – Constant Displacement | | | | | | | | | Microforce Displacement | | | | | | | |
|---|---|---|---|---|---|---|---|---|---|---|---|---|---|---|---|---|---|
| n | Nat Freq (Hz) | Peak Transmiss | Attenu Freq (Hz) | Transmiss at 6Hz | F(25%) (N) | F(65%) (N) | Grad (25%) (N/mm) | Grad (50%) (N/mm) | Grad (65%) (N/mm) | L(98N) (%) | L(196N) (%) | L(392N) (%) | K(49-147N) (N/mm) | K(147-441N) (N/mm) | K(343-441N) (N/mm) | Hysteresis (%) |
| 69 | No Data | No Data | No Data | No Data | No Data | No Data | No Data | No Data | No Data | No Data | No Data | No Data | No Data | No Data | No Data | No Data | No Data |
| 70 | No Data | No Data | No Data | No Data | No Data | No Data | No Data | No Data | No Data | No Data | No Data | No Data | No Data | No Data | No Data | No Data | No Data |
| 71 | No Data | No Data | No Data | No Data | No Data | No Data | No Data | No Data | No Data | No Data | No Data | No Data | No Data | No Data | No Data | No Data | No Data |
| 72 | No Data | No Data | No Data | No Data | No Data | No Data | No Data | No Data | No Data | No Data | No Data | No Data | No Data | No Data | No Data | No Data | No Data |

FIG - 4W

| | | Formulation Details - PPHP | | | | | | Process Details (Hand Pour) | | | | Products Using Formulation | | | | | | |
|---|---|---|---|---|---|---|---|---|---|---|---|---|---|---|---|---|---|---|
| n | Formula | Base Polyol | Copolymer Polyol | Water | Cross-linker | Catalyst | Surfactant | Isocyanate (100 Index) | Cure | TPR | Time to Crush | n | Seat Foam | Headrest | Armrest | IP | OH | Visor | Door | Carpet | Other |
| 61 | AK | 88.00 | 12.00 | 3.20 | 1.50 | 0.39 | 0.80 | TDI | 6 min | 4 min | 2 min | 61 | x | | | | | | | | |
| 62 | AL | 80.00 | 20.00 | 5.50 | 1.50 | 0.39 | 0.80 | TDI | | | 2 min | 62 | x | | | | | | | | |
| 63 | AM | 88.00 | 12.00 | 3.20 | 0.00 | 0.45 | 1.00 | TM20 | 6 min | 4 min | 2 min | 63 | x | | | | | | | | |
| 64 | AN | 80.00 | 20.00 | 5.50 | 0.00 | 0.45 | 1.00 | TM20 | | | 2 min | 64 | x | | | | | | | | |

| | | Formulation Details - PPHP | | | | | | Process Details (Hand Pour) | | | | Products Using Formulation | | | | | | |
|---|---|---|---|---|---|---|---|---|---|---|---|---|---|---|---|---|---|---|
| n | Formula | Base Polyol | Copolymer Polyol | Water | Cross-linker | Catalyst | Surfactant | Isocyanate (100 Index) | Cure | TPR | Time to Crush | n | Seat Foam | Headrest | Armrest | IP | OH | Visor | Door | Carpet | Other |
| 65 | AE | 87.14 | 12.86 | 3.20 | 1.50 | 0.36 | 0.90 | TDI | 6 min | 4 min | 2 min | 65 | x | | | | | | | | |
| 66 | AF | 78.57 | 21.43 | 5.50 | 1.50 | 0.36 | 0.80 | TDI | | | 2 min | 66 | x | | | | | | | | |
| 67 | AC | 87.14 | 12.86 | 3.20 | 0.00 | 0.41 | 1.00 | TM20 | 6 min | 4 min | 2 min | 67 | x | | | | | | | | |
| 68 | AD | 78.57 | 21.43 | 5.50 | 0.00 | 0.41 | 1.00 | TM20 | | | 2 min | 68 | x | | | | | | | | |

| | | Formulation Details - PPHP | | | | | | Process Details (Hand Pour) | | | | Products Using Formulation | | | | | | |
|---|---|---|---|---|---|---|---|---|---|---|---|---|---|---|---|---|---|---|
| n | Formula | Base Polyol | Copolymer Polyol | Water | Cross-linker | Catalyst | Surfactant | Isocyanate (100 Index) | Cure | TPR | Time to Crush | n | Seat Foam | Headrest | Armrest | IP | OH | Visor | Door | Carpet | Other |
| 69 | x | 85.00 | 12.00 | 3.20 | 1.50 | 0.40 | 0.75 | TDI | | | 2 min | 69 | x | | | | | | | | |
| 70 | x | 75.00 | 20.00 | 5.50 | 1.50 | 0.40 | 0.75 | TDI | | | 2 min | 70 | x | | | | | | | | |
| 71 | x | 85.00 | 12.00 | 3.20 | 0.00 | 0.40 | 0.70 | TM20 | | | 2 min | 71 | x | | | | | | | | |
| 72 | x | 75.00 | 20.00 | 5.50 | 0.00 | 0.40 | 0.70 | TM20 | | | 2 min | 72 | x | | | | | | | | |

| n | Cost | Dampening | Thermal | Lumbar | Durability | Comfort-Static | Comfort-Dynamic | Comfort Number | Recycability | Processability | Safety | Sustainability |
|---|---|---|---|---|---|---|---|---|---|---|---|---|
| | | | | | | Relative Performance Characteristics for Formulation | | | | | | |
| 61 | | - | Δ | | Δ | Δ | - | - | Δ | + | Δ | |
| 62 | | | Δ | - | - | - | - | - | Δ | - | Δ | |
| 63 | | - | Δ | - | - | - | - | - | Δ | + | Δ | |
| 64 | | | Δ | | - | - | - | - | Δ | - | Δ | |

| n | Cost | Dampening | Thermal | Lumbar | Durability | Comfort-Static | Comfort-Dynamic | Comfort Number | Recycability | Processability | Safety | Sustainability |
|---|---|---|---|---|---|---|---|---|---|---|---|---|
| | | | | | | Relative Performance Characteristics for Formulation | | | | | | |
| 65 | | - | Δ | - | Δ | Δ | - | Δ | - | + | Δ | |
| 66 | | | Δ | - | - | - | - | - | - | - | Δ | |
| 67 | | - | Δ | - | - | Δ | - | Δ | - | - | Δ | |
| 68 | | | Δ | - | - | - | - | - | - | - | Δ | |

| n | Cost | Dampening | Thermal | Lumbar | Durability | Comfort-Static | Comfort-Dynamic | Comfort Number | Recycability | Processability | Safety | Sustainability |
|---|---|---|---|---|---|---|---|---|---|---|---|---|
| | | | | | | Relative Performance Characteristics for Formulation | | | | | | |
| 69 | | | Δ | - | - | - | - | - | Δ | - | Δ | |
| 70 | | | Δ | - | - | - | - | - | Δ | - | Δ | |
| 71 | | | Δ | - | - | - | - | - | Δ | - | Δ | |
| 72 | | | Δ | - | - | - | - | - | Δ | - | Δ | | ative Application Ser. No. 60/877,889 filed Dec. 29, 2006, entitled
POLYURETHANE FOAM FORMULATION, PRODUCTS AND METHODS

CROSS REFERENCE TO PRIORITY APPLICATION

This application claims benefit of U.S. Provisional Application Ser. No. 60/877,889 filed Dec. 29, 2006, entitled "Polyurethane Foam and Data and Methods" and U.S. Provisional Application Ser. No. 60/877,927 filed Dec. 29, 2006, entitled "Polyurethane Foam and Methods," the content of which is incorporated herein by reference in its entirety.

FIELD

The present disclosure as currently understood relates to a polyurethane foam including a system and methods for making the same. The present disclosure as currently understood relates particularly to a polyurethane foam formulation exhibiting improved, particularly good vibration dampening characteristics for application in vehicles and use as a vehicle seat foam including as a seat bottom cushion and as a seat back cushion and to the methods of formulating and processing such foam for such applications.

BACKGROUND

It is generally known to provide a vehicle seat cushion for the comfort of an occupant of a vehicle, such as an automobile. Typically, it is known to formulate such a seat cushion from a polyurethane-based foam. Such foam may be formulated to be relatively soft and still provide a relatively high comfort level (e.g. "luxury feel") for an occupant. However, such soft foam may not always be sufficiently effective at dampening road vibration generated during movement of the automobile. To overcome this problem, a harder or more firm foam may be provided in the seat cushion to better dampen road vibration. However, such firm foams may provide less "cushion" and comfort (particularly over a longer period of time) relative to such soft foam.

It is also generally known to prepare such a polyurethane-based foam cushion according to a "one shot" process. In a one shot process, such generally known soft and firm polyurethane foams are typically formed from a mixture of a first (or polyol) stream and a second (or Isocyanate) stream. The polyurethane-based foam is typically composed of a polyurethane-based base polyol resin, a polyurethane-based copolymer polyol resin (co-polyol), water, a catalyst (or catalyst package, typically an isocyanate such as TDI or TM20) and a surfactant. The polyol stream is generally composed of a polyurethane polymer with a propylene oxide (PO) that may be manufactured with potassium hydroxide (KOH) and/or then ethylene oxide (EO) capped. Other generally known methods of manufacturing polyols include the use of Cobalt and Zinc Hydroxide, cesium hydroxide (CsOH), Iridium and rubidium hydroxide (RbOH). Such polyols can be made with or without EO capping. Other known methods of manufacture of polyols, which are not EO capped, includes using heavy metal cyanide complexes.

Such known soft and firm polyurethane foams may also be formed from a process of mixing the following components: a pre-polymer (e.g. a combination of a copolymer polyol and a base polyol such as the Acclaim™ polyol and Hyperlite XL™ synthetic resin commercially available from Bayer Corporation of Pittsburgh, Pa.), copolymer polyol, that may be PO capped only, water, catalyst, surfactant and an isocyanate.

It is generally understood to mix the components by pouring the two streams into a mold tool, closing the mold tool, and allowing the components to react. Heat may be optionally applied to the mold to help reduce the amount of time to cure the foam and thereby more quickly produce a foam article. After the foam is fully cured (e.g. after about 2 to 60 minutes—depending upon the amount of capital investment and part production time allowed), the foam article is removed from the mold (i.e. "demold") and is crushed (and may be repeatedly crushed) using a predetermined force to obtain a predetermined amount of reduction in size at a particular time (e.g. from 15 seconds to 8 minutes after demold). However, a problem with such generally known process is that the resulting foam article also is not always sufficiently effective at dampening road vibration generated during movement of the automobile. Further, there is a challenge with the generally known polyurethane formulations to use different base polyurethane resin materials in the base and/or in the copolymer polyol while still providing comparatively similar and/or improved performance characteristics.

It would be advantageous to provide a method for making polyurethane foam that permits control of performance characteristics of the foam. It would also be advantageous to provide a polyurethane foam having vibration dampening properties and suitable comfort that can be specifically tailored and applied to particular vehicle components including sub-components of a vehicle seat which allows for a broader variety of polyurethane resins materials to be used as part of the base polyol and/or the copolymer polyol. It would also be advantageous to provide such a polyurethane foam with such improved performance characteristics to allow for a reduction in need for other vibration reduction sub-systems in a vehicle (e.g. shocks, tires, springs, etc.). There remains a continuing need and it would be advantageous to provide such a polyurethane foam including a system or method having any one or more of these or other advantageous features.

SUMMARY in one exemplary embodiment, an open cell, polyurethane foam material is provided from the reaction product of a high molecular weight, low monol base polyol; a crosslinker having a blow to gel ratio of from 1:3 and 1:8, by weight; an isocyanate; a surfactant; and water, wherein the polyol and the isocyanate have an index of from 85-105.

In one particular embodiment, the polyol has a molecular weight of from 5000 to 10000. More particularly the polyol has a molecular weight of from 6000 to 8000.

In one exemplary embodiment, the monol content of the base polyol is less than 10% by weight. More particularly, the monol content of the base polyol is about 5% by weight.

In one particular embodiment, an open cell, polyurethane foam material is provided wherein the crosslinker has a blow to gel ratio of from 1:3 to 1:6. More particularly the crosslinker has a blow to gel ratio of from 1:3 to 1:5.

In yet a further exemplary embodiment an open cell, polyurethane foam material is provided wherein the polyol and the isocyanate have an index of from 90 to 98.

In yet a further exemplary embodiment an open cell, polyurethane foam material is provided wherein the surfactant concentration is from 0.2 pph to 0.7 pph.

In another exemplary embodiment, an open cell, polyurethane foam article is provided from the reaction product of a high molecular weight, low monol base polyol; a crosslinker having a blow to gel ratio of from 1:3 and 1:8, by weight; an isocyanate; a surfactant; and water, wherein the polyol and the isocyanate have an index of from 85-105. In particular, the polyol has a molecular weight of from 5000 to 10000 and more preferably the polyol has a molecular weight of from 6000 to 8000.

In one particular embodiment, the monol content of the base polyol is less than 10% by weight and, more preferably, the monol content of the base polyol is about 5% by weight.

In one particular embodiment, the crosslinker has a blow to gel ratio of from 1:3 to 1:6 and, more particularly, the crosslinker has a blow to gel ratio of from 1:3 to 1:5.

In yet a further exemplary embodiment an open cell, polyurethane foam article is provided wherein the polyol and the isocyanate have an index of from 90 to 98.

In yet a further exemplary embodiment an open cell, polyurethane foam article is provided wherein the surfactant concentration is from 0.2 pph to 0.7 pph.

In another exemplary embodiment, the article is a seat base cushion, a seat back cushion, a lumbar cushion, or a bolster cushion.

Another exemplary embodiment provides a method of making an open cell, foam article, by the steps of providing a high molecular weight, low monol base polyol; a crosslinker having a blow to gel ratio of from 1:3 and 1:8; by weight, an isocyanate; a surfactant; and water, wherein the polyol and the isocyanate have an index of from 85-105, to form a reaction mixture; disposing the reaction mixture into a mold to form the foam article; curing the foam article; removing the foam article from the mold; and crushing the foam article.

In one particular embodiment, the crushing step occurs between 60 and 600 seconds after the foam article is removed from the mold. More preferably, the crushing step occurs between 60 and 300 seconds after the foam article is removed from the mold. Even more preferably, the crushing step occurs between 60 and 120 seconds after the foam article is removed from the mold.

In a further exemplary embodiment, the crushing step includes first compressing the foam article to about 50% of its original height, then compressing the foam article to about 90% of its original height, and thereafter again compressing the foam article to 90% of its original height.

More preferably, the interval between each compression of the foam article is at least 30 seconds.

One exemplary embodiment relates to a method for making a foam article wherein the article is a seat base cushion, a seat back cushion, a lumbar cushion, or a bolster cushion.

In one particular embodiment of the method, the polyol is selected to have a molecular weight of from 5000 to 10000. More particularly the polyol is selected to have a molecular weight of from 6000 to 8000.

In one exemplary embodiment of the method, the monol content of the base polyol is less than 10% by weight. More particularly, the monol content of the base polyol is selected to be about 5% by weight.

In one particular embodiment of the method, the crosslinker has a blow to gel ratio of from 1:3 to 1:6. More particularly the crosslinker has a blow to gel ratio of from 1:3 to 1:5.

In yet a further exemplary embodiment of the method, the polyol and the isocyanate are selected to have an index of from 90 to 98.

In yet a further exemplary embodiment of the method, the surfactant concentration is selected to be from 0.2 pph to 0.7 pph.

Several exemplary embodiments are disclosed herein. However, it is to be understood that the disclosed embodiments are merely exemplary and may be embodied in various and alternative forms. Therefore, specific details disclosed herein are not to be interpreted as limiting, but merely as a representative basis for the claims and/or as a representative basis for teaching one of ordinary skill in the art. Accordingly, unless otherwise expressly stated, all numeral quantities in this description indicating amounts of material are to be understood as modified by the word "substantially" in describing the broadest scope supported herein it being understood that practice within the numerical limit is most preferred.

FIGURES

DETAILED DESCRIPTION

Figure 1:
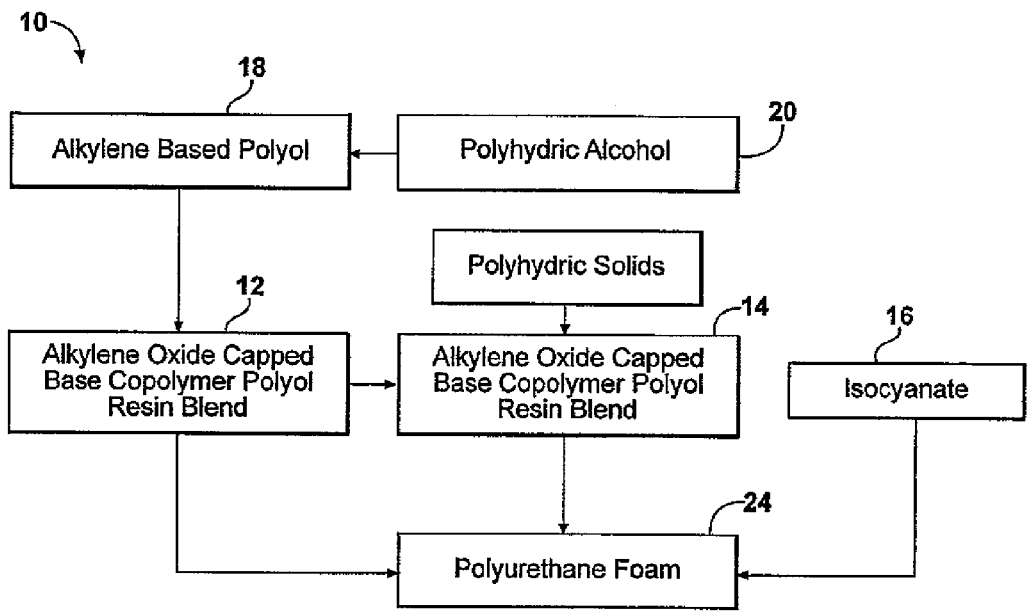
FIG. 1 is a block diagram of a system and method used to make a polyurethane-based foam article.

The present disclosure and inventions identified herein, as currently understood, relate to ethylene oxide (EO) capped base polyol resin-based foam formulations having a monol content of less than about 10% molar concentration and preferably about 5% molar concentration. that can be produced from a greater variety of base polyol resin materials. The present disclosure and inventions identified herein, as currently understood, also relate to an EO capped base copolymer polyol having a monol content less than about 8% molar concentration. The urethane-based polyol resin blend is preferably made using a water overpacking technique wherein the foam formulation placed in a mold tool in a one shot process includes a greater amount of water than is required for a stoichiometric reaction to provide the resulting foam article with greater density than the resulting foam article would have from the stoichiometric reaction.

The present disclosure, as currently understood, further relate to a polyurethane foam made by the process of reacting an EO capped base polyol resin, an EO capped base copolymer polyol resin and an isocyanate. The present disclosure and inventions identified herein, as currently understood, further relates to a polyurethane foam having an improved attenuating vibration characteristic wherein the foam has a natural frequency of less than about 4.6 Hertz and a transmissivity of about 3.6 or less for a 50 mm-100 mm thick cushion.

The present disclosure, as currently understood, further relate to a polyurethane foam article for attenuating vibration in a vehicle seat wherein the polyurethane foam article has a natural frequency of about 2.6 to 4.3 Hertz and a transmissivity of about 1.01 to 3.5 at that natural frequency while being manufactured from a variety of base polyol sources for a 50 mm-100 mm thick cushion.

The present disclosure, as currently understood, further relate to a polyurethane foam article having improved pressure distribution. The improvement can be objectively determined by the rate at which a fixed weight sinks into the polyurethane foam article wherein the sink rate is about 30 to 50% less than that of a prior art high resilient foam article.

The present disclosure, as currently understood, further relates to a method of making a polyurethane foam comprising the steps of selecting a base polyol resin from a source being generally locally available near a foaming plant, ethylene oxide capping the locally available base polyol resin, ethylene oxide capping a locally available base copolymer polyol resin, and foaming (by pouring into a mold tool in a one shot process) the locally available capped base polyol and the locally available capped copolymer polyol with any available isocyanate, a surfactant and water to mold a foam article, and then demolding the foamed article and crushing the foamed article at a particular time after demold and for a particular duration. The method may further include, at a particular time during the curing of the foamed material, a tool pressure release (TPR) to release the pressure from the mold tool to vent off-gasses of the foaming process and to lower the temperature of the foamed article.

Referring to FIG. 1, a polyurethane foaming system 10 for producing a polyurethane-based foam article is shown. While the foaming system and process are primarily for a polyurethane-based foam, it should be understood that the system and foam formulation may be modified to include a portion of the foam being made from a non-polyurethane-based resin material. The foaming system 10 includes the reaction of an alkylene oxide capped base polyol resin blend 12, an alkylene oxide capped base copolymer polyol resin blend 14, and isocyanate 16. The resin blends include base polyol components, water, surfactant, silicone and catalyst according to alternative embodiments. The base polymer polyol resin may include polymer solids such as "SAN" styrene acrylonitrile in varying proportions of between about 80/20 to about 20/80 and preferably have a blend of about 50/50 styrene to acrylonitrile.

Figure 2:
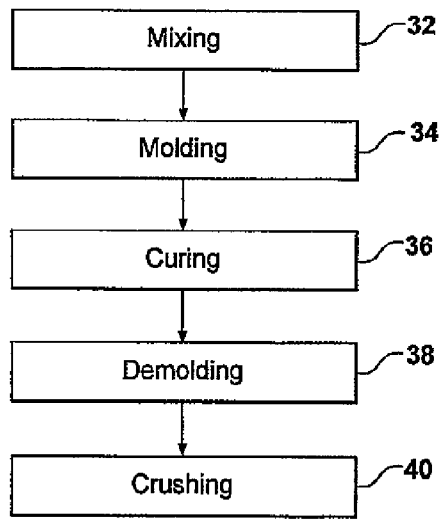
FIG. 2 is a block diagram of the method steps used to make the polyurethane-based foam article according to an exemplary embodiment.

As best shown in FIG. 2, the reaction is performed by a "one shot" process according to one exemplary embodiment. The one shot process includes mixing the components for making the foam in a mix head, pouring the foam into a foam mold tool, molding a foam article, curing the foam article, demolding the foam article, and crushing the foam article. The foam article is crushed a pre-selected number of times during a pre-selected time period after demold. The resulting foam article may be generally in the shape of a block having particular dimensions or may have a particular contoured shape usable for a particular application, such as a vehicle seat cushion, according to alternative embodiments. The water and catalyst may be used to do the blowing of the foam materials, thus affecting the desired foam density.

Referring further to FIG. 1, alkylene oxide capped based polyol resin blend 12 is prepared by an oxide capping step of an alkylene based polyol 18. Alkylene based polyol 18 is formed by a chain extension step (e.g. oxyalkylation) of an active hydrogen compound (shown as a polyhydric alcohol 20) with an alkylene oxide (e.g. EO, propylene oxide (PO), etc.) in the presence of a heavy metal catalyst such as zinc, cobalt, or double metal cyanide (DMC) complex catalysts.

In one embodiment, the alkylene oxide capped base polyol and copolymer polyols are provided as reactants to form the base of the foam material, which further includes water, a surfactant, optional resins and catalyst in sufficient quantities to form the foam. According to one exemplary embodiment, the reactants include less than about 15% water. The amount of water and catalyst in the resins may be varied to regulate the density of the resulting foam.

In one embodiment, the base copolymer polyol is an EO capped base copolymer polyol according to one exemplary embodiment. EO capped base copolymer polyol resin 12, which may add firmness to the foam, is formed by reacting alkylene oxide capped base polyol resin 12 with polymer solids 22. A suitable polymer solid includes styrene acrylonitrile (SAN) provided in dispersion. For example, a copolymer polyol of styrene and acrylonitrile (SAN) at 30 percent solids includes 70% base polyol and 30% dispersed solids of styrene and acrylonitrile. The total percentage of the solids for the copolymer polyol can be less than about 70%, preferably 10 to 50%, more preferably 20 to 40%, more preferably 25 to 35%. The solids may alternatively be SAN, 100% acrylonitrile, polyurea solids, polyurethane solids, grafted polyol, PHD, PIPA. According to an alternative embodiment, for higher percentages of acrylonitrile, the copolymer may include an antioxidant or flame inhibiting material. The solids SAN can be composed of ratios of 100% styrene to 100% acrylonitrile and any combination in between (e.g. to vary the hardness of the resulting foam) according to alternative embodiments. According to alternative embodiments, the polymer solids can include about 10 to 50 parts SAN with the SAN ratio ranging from about 10/90% to 90/10%, between about 10 and 30 parts of 100% acrylonitrile polyol, between about 10 and 25 parts of polyurea polymer polyol, and/or between about 10 and 20 parts polyurethane polymer polyol. According to a exemplary embodiment, the solids of the copolymer polyol include about 5 to 95% styrene and about 95 to 5% acrylonitrile, polyurea, polyurethane, or 100% acrylonitrile.

The isocyanate is toluene di-isocyanate (TDI which is preferably a blend of 2,4 isomer 80% and 2,6 isomer 20%) according to an exemplary embodiment. According to alternative exemplary embodiments, the isocyanate may be di- or polyisocyanate or mixture thereof, including polymeric isocyanate (PMDI). According to other exemplary embodiments, the isocyanate may be a blend of materials. Suitable isocyanate blends include a blend of TDI and meta phenylene di-isocyanate (MDI), with a blend ratio of from about 5/95 to about 95/5 (also TDI80/TM20). Another suitable isocyanate includes a blend of MDI and polymeric isomers, with an isomer ratio of about 2.0 to about 2.9.

Without intending to be limited to any particular theory, the overall reaction sequence for formation of the polyurethane foam is believed to be as follows:

1. Water+isocyanate→symmetric urea(1)+carbon dioxide
2. Isocyanate+amine→asymmetric urea
3. Isocyanate+polyol→urethane(1)
4. Copolymer polyol+isocyanate→pre-polymer (with free isocyanate functionality)
5. Urethane+isocyanate→allophanate
6. Symmetric urea(1)+isocyanate→biuret
7. Pre-polymer+water→urea symmetric(2)+carbon dioxide
8. Pre-polymer+polyol→urethane(2)

The result of these reactions is a polyurethane foam having urea(1)-urethane(1)-urea(2)-urethane(2)-urea(1)-urethane(1), segments or chains, where each of the urethane(2) and urea(2) segments are directly attached to the pre-polymer.

Because the copolymer polyol molecules of the pre-polymer are of a fixed length, certain of the urea and urethane segments of the resulting foam also tend to have a fixed length. Specifically, a urea segment and a urethane segment are provided that have a relatively large chain length (i.e. the urea segments or links are separated by the pre-polymer and the urethane segments or links are separated by the pre-polymer). Such relatively large chain urea segments may enhance load-bearing characteristics of the polyurethane foam while maintaining or enhancing physical properties.

The urethane urea(1) and urea(2) segments are not necessarily the same length or molecular weight due to the direct attachment of urea(2) to the pre-polymer. Likewise, the urethane(1) and urethane(2) segments are not necessarily the same length or molecular weight due to the direct attachment of urea(2) to the pre-polymer. The chain length of the urea(2) and urethane(2) segments are "fixed" due to the pre-polymer (i.e. the pre-polymer fixes the length of the copolymer polyol), and should have greater load bearing capability than the urea(1) and urethane(1) molecules or segments. The urea (2) chain may have the structure urea-pre-polymer-urea, and the urethane(2) chain may have the structure urethane-pre-polymer-urethane. In contrast, the chain length of urea(1) and urethane(1) is variable, which is believed to be dependent on the polyol and catalyst components of the poly resin blend.

According to one exemplary embodiment, the isocyanate includes between about 50 to 125 parts of the stoichiometric ratio (index) to the hydroxyl groups (having OH numbers of between about 38 and about 15, with lower hydroxyl numbers generally providing better performance characteristics) the resin blends, preferably about 1:1 (100 index) free isocyanate to free hydroxyl groups. According to one exemplary embodiment, foaming process is "over-packed" by between about 1% and about 25% water and, more suitably, is over-packed by between about 10% and about 15% water. The isocyanate stream may be maintained at a temperature of about 65° F. to 180° F.

The isocyanate includes less than or about 50 to 125 parts of the stoichiometric ratio (index) to the hydroxyl groups of the resin blends and is preferably about 1:1 (100 index) free isocyanate to free hydroxyl groups. The isocyanate may include less than about 40% free isocyanate content. The isocyanate index is between about 70 and about 115 and more suitably between about 90 and about 110 and most suitably is about 100. A foam formulation having a TDI isocyanate at a 100 index provides a foam article generally having the lowest natural frequency and transmissivity.

Water over-packing may affect the particular timing and amount of a TPR process as well as the particular time, duration and cycle of the crushing to obtain a given performance criteria. Accordingly, the foam crushing process details (time, amount and cycles) are modified for a foam article produced using a TPR process. In particular, typically the crushing time is sooner, the amount of crush is greater and a greater number of crush cycles are required to obtain a similar or equivalent performance criteria than a similar, non-TPR foam article.

It should be noted that it is generally preferable to increase the molecular weight to provide increased performance characteristics of the resulting foam article, in particular, for increased durability and rebound performance. By increasing the molecular weight of the polyol resin and resulting foam formulation, better performance characteristics may be obtained at a lower weight for a given size object at about an equivalent cost. Alternatively, also by increasing the molecular weight of the polyol resin and the resulting foam formulation, notably better performance characteristics may be obtained at a similar weight for a given size foam article at about an equivalent to slightly higher cost. The molecular weight of the polyol is preferably greater than about 3000, suitably about 4000 to about 8000, more suitably about 6000 to about 8000, and even more suitably about 6800.

According to one exemplary embodiment the polyol may be E960 Hyperlite™ III base low monol polyol, E971 Hyperlite™ III base co-polymer polyol with a low monol base, E828 Hyperlite™ II base polyol or E841 Hyperlite™ II co-polymer polyol each commercially available from Bayer Corporation of Pittsburgh, Pa. According to one exemplary embodiment, the polyol may be TPOP05-45 base low monol polyol commercially available from Tianjin Third Petrochemical Company of Tianjin, China. According to another exemplary embodiment, the base polyol may be a E880S base low monol polyol commercially available from Korea Polyol Company LLC of Seoul, Korea. These alternate base polyols are very beneficially locally available from their respective producers for use in local polyurethane foam manufacturing operations.

The copolymer or polyol blend for the polyol stream may include water, surfactant and catalyst in sufficient quantities to form the foam. Variation of the amount of water and catalyst may vary the density of the resulting foam. According to an exemplary embodiment, the blend includes less than about 15% water. The polyol blend comprises about 1 to 99% of the total mix.

The copolymer (polyol) blend (the base polyol and pre-polymer polyol) may include a polyol such as glycol, sorbitol, sucrose, pentaerythritol, penta-ethrylol, etc. preferably available in appropriate supply quantity from a source reasonably local to the location of the foaming process. According to an exemplary embodiment, the polyol is a polyether polyol. The functionality of the polyol resin may be monol, diol, triol or hexanol. The average functionality of the polyol is less than about 6 and greater than about 2, suitably about 2.2 to about 4, suitably about 2.5 to about 3.5, most suitably about 2.9 to about 3.0. According to one exemplary embodiment, the copolymer blend includes less than about 6% monol by molar concentration and more suitably less than about 3% monol by molar concentration.

A surfactant typically used for TDI based foams model no. 8681 commercially available from Goldschmit Corporation and a surface-active surfactant model no. 5169 commercially available from Air Products and Chemicals, Inc. of Allentown, Pa. may be used in any formulation and is considered to give the lowest natural frequency. In one alternate embodiment, a combination of a surface-active surfactant typically used in energy absorbent foams model no. 5164 commercially available from Air Products and Chemicals, Inc. and surfactant model no. 5169 commercially available from Air Products and Chemicals, Inc. may be used and is considered to normally provide the lowest transmissivity. In a further alternate exemplary embodiment, a combination of a surfactant typically used in hot foam formulations model no. 6164 commercially available from Witco Chemical Corporation and surfactant model no. 5169 commercially available from Air Products and Chemicals, Inc. may be used in the foam formulation. A surfactant typically used in slab foam formulations model no. 5160 commercially available from Air Products and Chemicals, Inc. and surfactant model no. 5169 commercially available from Air Products and Chemicals, Inc may also be used. According to one exemplary embodiment, the concentration of the surfactant ranges from about 0.2 pph to 0.7 pph.

"Transmissivity" is the vibration (e.g., road vibration experienced by the wheels of the vehicle) that is transferred by the foam cushion (e.g., to an occupant of the vehicle seat). The transmissivity of the foams of the may be obtained according to the following test method using a test scale model number 318.108 commercially available from MTS Corporation of Minneapolis, Minn. Transmissivity includes "$A/A_o$" at "natural frequency." "$A_o$" is the input peak acceleration. "A" is the response to $A_o$. Natural frequency is the frequency where the $A/A_o$ ratio is the highest and the amplification of $A_o$ is the greatest.

The Seat Effective Amplitude Transmissibility value ("SEAT" value) is a determined characteristics which represents the relationship of the transmissivity in a vehicle application. This value is determined by the comparison of the VDVo (Vibrational Dose Value) from the occupant, divided by the VDVr from the road input to the seat multiplied by 100 and is described in the book by Michael Griffin, Handbook of Human Vibration ($1^{st}$ ed. 1990) at page 404-413. For example if the road input vibration is 1.00 (VDVr) and the seat occupant vibration is 0.8 (VDVo), then the S.E.A.T. is 80%. Suitable vibration absorbent foam allows for a reduction of the SEAT value by at least as much as 20%. Therefore a representative test for providing a performance characteristic of the foam for use in a vehicle seat system, the SEAT value is considered a good measure of the seat system performance. Included in the SEAT value is the percentage contribution from the foam. An improvement of the $A/A_o$ value of the foam is directly proportional to the SEAT value.

One goal of for the foam formulation and process used to make the foam article is to obtain the best SEAT value for a given height and density of foam article. It has been determined that better SEAT values result when the transmissibility (A/Ao) value is relatively low and the natural frequency of the foam is near its lowest which is obtained by formulating foam having a relatively higher molecular weight. In one exemplary embodiment, one further measure of the potential real performance of a foam product in a vehicle seat application is to multiply the natural frequency times the peak measured transmissivity (A/Ao) to provide a "comfort value". It has been determined that a suitable range for such a comfort value is between about 6.5 to 18.5, more suitably between about 8.5 and 13.5, and most suitably between about 10.5 and 12.5. A comfort value below 13.0 for automotive seating generally gives an acceptable SEAT performance on any road profile which is most desirable.

Figure 3:
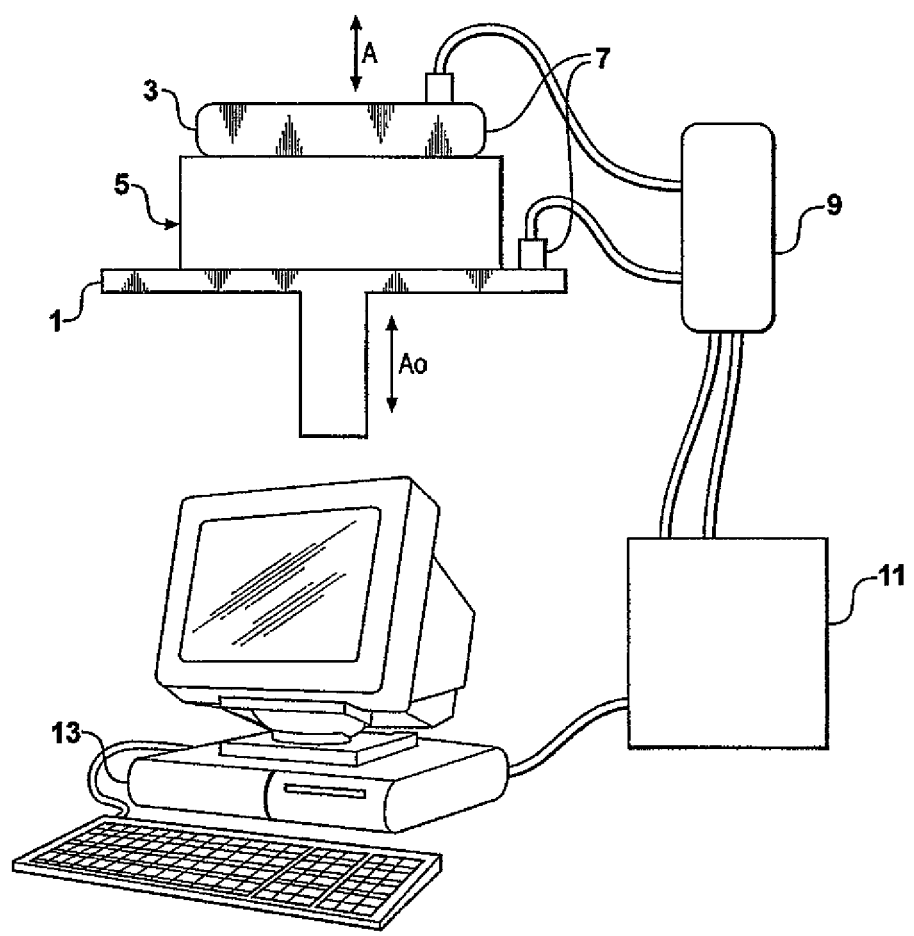
FIG. 3 is a schematic diagram of an apparatus to determine the transmissivity of a foam article.

A schematic diagram of a suitable test apparatus for determining transmissivity is shown in FIG. 3. Samples of the foams were placed on a servo-hydraulic actuated base plate 1 (MTS Corp., Minneapolis, Minn.) and a mass 3 was set freely on the foam 5. The mass was 50 lbs and was the same diameter as a standard IFD indentor foot (200 mm). Acceleration data were measured via accelerometers 7 (e.g. PCB Piezoelectronics) powered by power supply 9 and data acquired by data acquisition module 11, and were analyzed and recorded in real time on a computer 13. The servo-hydraulic actuator was programmed to perform a frequency sweep from 1 to 16 Hz in 150 seconds. During the sweep, the amplitude was decreased as the frequency increased to maintain a constant peak input acceleration ($A_o$) of 0.2 g. Transmissivity is reported as the measured acceleration response (A) divided by the input ($A_o$) peak acceleration.

A 400 mm×400 mm×100 mm (thickness) "test block" molded foam article is placed under an 203 mm (approximately 8") diameter plate and a load cell was used for the Formulations. A load cell determined the amount of force (typically in Newtons) required to obtain a 25% deflection of the plate into the foam article. The performance characteristics of the foam of the Formulations may be determined using Japanese Automotive Standards Organization (JASO) specifications for testing.

Two polyurethane foams were processed to obtain foam articles (Formulation A and Formulation B) using a one-shot process by reacting a base polyol resin, a copolymer polyol, and an isocyanate package (including a surfactant and a crosslinker). The materials were mixed in a mixing head (typically for less than about 0.3 seconds) and then poured into a mold tool (takes about 3 seconds of pour time), and were then allowed to cure in the closed mold tool for 240 seconds at about 145 degrees Fahrenheit and included a TPR at 120 seconds and then demolded. The foam articles were made at about 100 to 105 index. The target density of the foams were about 58 Kg/m$^3$ (Formulation A) and about 62 Kg/m$^3$ (Formulation B).

Each resulting foam article was then crushed once at 2 minutes after demold. The crusher is a hard roll crusher with 3 successive rollers. The first roller performs a 50% compression roll (i.e. compression to 50% of the original thickness of the foam), the second roller performs a 90% compression roll and the third roller performs a 90% compression roll, preferably with at least a thirty second interval between the application of each roller. A "single crush" includes running the foam through the crusher (i.e. a 50-90-90% crush).

The advantage of the foam crushing process post demold is that it improves various dampening of road vibration through the seat system, but mainly the crushed polyurethane foam allows the occupant to have better perceived comfort. The improved vibrational performance characteristic is identified as an improved S.E.A.T. (Seat Effective Amplitude Transmissibility) value.

This means that the crushed foam in the seat system further reduces the vibration that seat occupant feels from the road-input vibration. The interrelationship of time from demold to crush and the number and amount (%) of crushes performed is tailored to obtain particular desired properties.

To a vehicle system engineer, an improved SEAT value means that the foam in the seat may actually reduce road noise to the occupant. If this reduction occurs and is of a significant and sufficient amount, then the vehicle system engineer may reduce the amount of cost in shocks, tires, and springs of a vehicle while still maintaining the same or similar user seat comfort. An alternative to a reduction in these other vehicle systems is to improve the luxury feel of the ride of a given vehicle with a less expensive suspension.

In on exemplary embodiment a foam article (i.e., a seat bottom cushion) is crushed at from 10 seconds after demold to 96 hours, between about 10% and about 90% of its original thickness, between 1 and 36 times to obtain a transmissivity (A/Ao) value between about 1.01 and about 3.5 at a natural frequency of the foam and that natural frequency is between about 2.0 hertz and about 4.0 Hertz (and more suitably is between about 2.3 hertz and about 4.3 Hertz or about 2.6 Hertz and about 4.6 Hertz). The polyurethane foam seat cushion is between about 25 mm to about 150 mm in thickness.

A control Formulation A provides a foam article preferably useable in a vehicle seat bottom foam application and includes about 70 parts per hundred base polymer (PPHP) of Hyperlite III™ (E960 having a hydroxyl number of 23 (OH#23-27 with a mid point of 25)) and an EO capped base copolymer, polyol resin blend, at about 30 PPHP Hyperlite III™ (E971) about 29.609 PPHP TDI-3.2, 0.1 PPHP of amine catalyst, and 1.1 PPHP of surfactant. The amine catalyst preferably includes both a blowing catalyst (NIAX A-1, Momentive Performance Materials, Wilton, Conn.) and a gelling catalyst (33LV Air Products) diluted in dipropylene glycol. The surfactant preferably includes both a surface surfactant (No. 5164, Air Products) and a bulk surfactant (No. 5169, Air Products) which yields better dampening. The control Formulation A is allowed to cure for 4 minutes, with TPR performed at 2 minutes, and is then demolded and is crushed at 2 minutes post demold.

Control formulation B foam includes about 50 PPHP of Hyperlite III™ (E960) base polyol resin, about 50 PPHP Hyperlite III™ (E971) copolymer polyol and about 31.387 PPHP of TDI. Control formulation B is molded and cures for 4 minutes, with TPR at 2 minutes, and is then crushed at 2 minutes post demold. Control formulations A and B are shown in Table 1.

TABLE 1

| Formulation A | PPHP | Formulation B | PPHP |
|---|---|---|---|
| E960 (OH# 23) | 70.000 | E960 (OH# 23) | 50.000 |
| E971 | 30.000 | E971 | 50.000 |
| Total Water | 2.30 | Total Water | 2.50 |
| DEOA (neat) | 1.500 | DEOA (neat) | 1.500 |
| Amine Catalyst | 0.4 | Amine Catalyst | 0.4 |
| Surfactant | 1.100 | Surfactant | 1.100 |
| Isocyanate (TDI) | 29.609 | Isocyanate (TDI) | 31.387 |
| Percent Solid | 10.8 | Percent Solid | 18.0 |
| Total | 134.909 | Total | 136.787 |

(Where "PPHP" is parts per hundred based on 100 parts polyol.)

Foam articles are made using Formulation A and Formulation B according to the process described herein. Additionally, foam articles are made using Formulation C and Formulation D wherein the only different constituent is the copolymer polyol blend which is from a particular source for providing a location-specific formulation. In Formulations C and D, the TPOP05-45 Tianjin copolymer polyol blend is present. However, to make an effective comparison for the control formulations and provide a PPHP equivalent material, the proportion of base polyol to copolymer polyol is recalculated to account for a change in the amount of solids present in the differing copolymer polyol blends. For the TPOP05-45, there is a different amount of solids present including a different ratio of styrene to acrylonitrile (S.A.N.). While a copolymer with any suitable amount ratio of S.A.N. may be used, typical ratios from between about 20:80 to about 80:20 and more suitable ratios range from about 30:70 to 70:30. The TPOP05-45 is estimated to have about twenty percent greater total solids present than the comparable E971 so twenty percent less copolymer polyol is used (24.00 PPHP) and a greater amount of base polyol is used (76.00 PPHP) to maintain an equivalent solid percentage.

TABLE 2

| Formulation C | PPHP | Formulation D | PPHP |
|---|---|---|---|
| E960 (OH# 23) | 76.00 | E960 (OH# 23) | 60.00 |
| TPOP05-45 | 24.00 | TPOP05-45 | 40.00 |
| Total Water | 2.30 | Total Water | 2.50 |
| DEOA (neat) | 1.50 | DEOA (neat) | 1.50 |
| Amine Catalyst | 0.41 | Amine Catalyst | 0.41 |
| Surfactant | 1.13 | Surfactant | 1.13 |
| Isocyanate (TDI) | 29.741 | Isocyanate (TDI) | 31.588 |
| Percent Solid | 10.8 | Percent Solid | 18.0 |
| Total | 135.081 | Total | 137.128 |

Each foam article resulting from Formulations A, B, C and D is then tested using the standard test methodologies detailed herein to obtain the performance criteria identified in Table 3.

TABLE 3

| Property | Formulation A | Formulation B | Formulation C | Formulation D |
|---|---|---|---|---|
| 25% ILD, N | 290.24 | 293.30 | 274.31 | 329.12 |
| 50% ILD, N | 506.95 | 513.50 | 484.92 | 589.40 |
| Density (estimated) | 62 | 58 | 62 | 58 |
| Hysteresis Loss % | 17.09 | 21.51 | 16.97 | 20.29 |
| Mass, grams | 1035 | 954 | 1040 | 968 |
| Natural Frequency Hz | 3.10 | 3.14 | 3.05 | 3.35 |
| A/Ao at Natural | 5.99 | 4.11 | 6.12 | 6.80 |
| Comfort Number | 18.57 | 12.91 | 18.67 | 22.78 |

The transmissivity of the foam articles made using Formulations C and D are generally higher for Formulation C and notably higher for Formulation D and as a result, an occupant of a vehicle sitting on a seat cushion may perceive greater input acceleration $A_o$ (road vibration) and thus less comfort. Similar results are obtained for the Comfort Number, however, the Formulation C provides a relatively comparable measure to Formulation A. Accordingly, Formulation C and its particular copolymer polyol blend material is considered a potential good geographically diverse, locally-available substitute to the E971. For Formulation C, a resulting foam article is relatively comparable comfort performance (slightly lower) while being mostly equivalent in other respects. Formulation D however provides relatively substantially lower comparative comfort performance.

Since the natural frequency and transmissivity of the foam may also be dependent on the post demold time and the number of cycles the foam article is crushed, the Formulations C and D may be improved by modifying the particular production process to obtain improved performance characteristics. Since the natural frequency of the foam initially drops as the number of crushes increases, and the transmissivity increases as the number of crushes increases, improved comfort performance may be obtained.

Further, a longer cure time in the mold tool (from between about 2 minutes 30 seconds to about 6 minutes) may be used to obtain a lower density foam article (at a given molecular weight material) to obtain a comparably better performing foam article at about a ten to fifteen percent lower weight. A longer cure time may be particularly better suited for locations where a short cycle time is not as costly (i.e., locations with lower labor unit costs).

Foam articles were made using Formulation E and Formulation F (see Table 4) wherein the only changed constituent (compared to Formulation A and Formulation B) is the copolymer polyol blend which is identified to come from a particular source for providing a location-specific formulation. For Formulations E and F, the KE880S copolyol polymer is used. Again, to make an effective comparison for the control formulations and provide a PPHP equivalent material, the proportion of base polyol to copolymer polyol must be recalculated to account for a change in the amount of solids present in the differing copolymer polyol blends. the KE880S has a different amount of solids present including a different SAN ratio. The KE880S is estimated to have about 14.3 percent greater total solids present than the comparable E971 so 14.3 percent less copolymer polyol was used (25.71 PPHP) and a greater amount of base polyol is used (74.29 PPHP) to maintain an equivalent solid percentage.

TABLE 4

| Formulation E | PPHP | Formulation F | PPHP |
|---|---|---|---|
| E960 (OH# 23) | 74.29 | E960 (OH# 23) | 57.14 |
| KE880S | 25.71 | KE880S | 42.86 |
| Total Water | 2.30 | Total Water | 2.50 |
| DEOA (neat) | 1.50 | DEOA (neat) | 1.50 |
| Amine Catalyst | 0.40 | Amine Catalyst | 0.40 |
| Surfactant | 1.10 | Surfactant | 1.10 |
| Isocyanate | 29.722 | Isocyanate | 31.576 |
| Total | 135.022 | | 137.076 |

Each foam article resulting from Formulations E and F are tested using the standard test methodologies detailed herein to produce the performance criteria identified in Table 5 (which repeats the information for A and B).

TABLE 5

| Property | Formulation A | Formulation B | Formulation E | Formulation F |
|---|---|---|---|---|
| 25% ILD, N | 290.24 | 293.30 | 300.69 | 326.62 |
| 50% ILD, N | 506.95 | 513.50 | 527.20 | 588.98 |
| Density (estimated) | 62 | 58 | 62 | 58 |
| Hysteresis Loss % | 17.09 | 21.51 | 17.49 | 21.42 |
| Mass, grams | 1035 | 954 | 1051 | 977 |
| Natural Frequency Hz | 3.10 | 3.14 | 3.13 | 3.40 |
| A/Ao at Natural | 5.99 | 4.11 | 8.83 | 6.62 |
| Comfort Number | 18.57 | 12.91 | 27.64 | 22.51 |

The transmissivity of the foam articles made using Formulations E and F are generally very significantly higher for both and as a result, an occupant of a vehicle sitting on a seat cushion may perceive far greater input acceleration $A_o$ (road vibration) and significantly reduced comfort levels. Similar results are obtained for the comfort number for both Formulations E and F. Accordingly, Formulations E and F and their particular copolymer polyol blend material are considered only a potentially acceptable geographically diverse, locally-available substitute to the E971. For Formulation F, a resulting foam article is relatively comparable comfort performance (slightly lower) while being mostly equivalent in other respects. Formulation E however provides relatively substantially lower comparative comfort performance. Again, since the natural frequency and transmissivity of the foam may also be dependent on the post demold time and the number of cycles the foam article is crushed, the Formulations E and F may be improved by modifying the particular production process to obtain improved performance characteristics. Since the natural frequency of the foam initially drops as the number of crushes increases, and the transmissivity increases as the number of crushes increases, improved comfort performance may be obtained. Further, a longer cure time in the mold tool (from between about 2 minutes 30 seconds to about 6 minutes) may be used to obtain a lower density foam article (at a given molecular weight material) to obtain a comparably better performing foam article at about a ten to fifteen percent lower weight. A longer cure time is believed to be particularly better suited for locations where a short cycle time is not as costly (i.e., locations with lower labor unit costs).

Foam articles may be made using Formulation G and Formulation H (see Table 6) wherein the changed constituents (compared to Formulation A and Formulation B) in both the base polyol (which is a relatively lower monol E960 material) and the TPOP05-45 Tianjin copolymer polyol blend of Formulations C and D may be used and similarly re-balanced to make the percent solids equivalent.

TABLE 6

| Formulation G | PPHP | Formulation H | PPHP |
|---|---|---|---|
| X960 (OH# 20) | 76.00 | X960 (OH# 20) | 60.00 |
| KE880S | 24.00 | KE880S | 40.00 |
| Total Water | 2.30 | Total Water | 2.50 |
| DEOA (neat) | 1.50 | DEOA (neat) | 1.50 |
| Amine Catalyst | 0.43 | Amine Catalyst | 0.41 |
| Surfactant | 1.29 | Surfactant | 1.24 |
| Isocyanate (TDI) | 29.444 | Isocyanate (TDI) | 31.309 |
| Percent Solid | 10.8 | Percent Solid | 18.0 |
| Total | 145.764 | | 154.959 |

Each foam article resulting from Formulations G and H may be tested using the standard test methodologies detailed herein to provide performance criteria identified in Table 7 (which repeats the information for A and B).

TABLE 7

| Property | Formulation A | Formulation B | Formulation G | Formulation H |
|---|---|---|---|---|
| 25% ILD, N | 290.24 | 293.30 | | |
| 50% ILD, N | 506.95 | 513.50 | | |
| Density (estimated) | 62 | 58 | | |
| Hysteresis Loss % | 17.09 | 21.51 | | |
| Mass, grams | 1035 | 954 | | |
| Natural Frequency Hz | 3.10 | 3.14 | | |
| A/Ao at Natural | 5.99 | 4.11 | | |
| Comfort Number | 18.57 | 12.91 | | |

The transmissivity of the foam articles made using Formulations G and H may be generally higher and as a result, an occupant of a vehicle sitting on a seat cushion would perceive greater input acceleration $A_o$ (road vibration) and reduced comfort levels. Similar results may be expected for the comfort number for both Formulations G and H. Accordingly, Formulations G and H and their particular copolymer polyol blend material may be considered only a potentially acceptable geographically diverse, locally-available substitute to the E971.

A control Formulation A-A provides a relatively high water foam article preferably useable in a vehicle seat back foam application and includes about 85 parts per hundred polymer (PPHP) of Hyperlite III™ (E960 having a hydroxyl number of 23 (OH#23-27 with a midpoint of 25)) and an EO capped base copolymer, polyol resin blend, at about 15 PPHP Hyperlite III™ (E971) and about 38.403 PPHP TDI-3.2. The amine catalyst preferably includes both a blowing catalyst (NIAX A-1, Momentive Performance Materials, Wilton, Conn.) and a gelling catalyst (for example, 33LV, Air Products) diluted in dipropylene glycol. The surfactant preferably includes both a surface surfactant (No. 5164, Air Products) and a bulk surfactant (No. 5169, Air Products). The control Formulation A-A was allowed to cure for 6 minutes including TPR at 4 minutes and was then demolded and was crushed at 2 minutes post demold.

Control formulation A-B foam may include about 75 PPHP of Hyperlite III™ (E960) base polyol resin, about 25 PPHP Hyperlite III™ (E971) copolymer polyol and about 60.564 PPHP of TDI-5.5. The control formulation A-B may be molded and allowed to cure for 6 minutes including TPR at 4 minutes and crushed at 2 minutes post demold. Control formulations A-A and B-A are shown in Table 8.

TABLE 8

| Formulation A-A | PPHP | Formulation A-B | PPHP |
|---|---|---|---|
| E960 (OH# 23) | 85.00 | E960 (OH# 23) | 75.00 |
| E971 | 15.00 | E971 | 25.00 |
| Total Water | 3.20 | Total Water | 5.50 |
| DEOA (neat) | 1.50 | DEOA (neat) | 1.50 |
| Amine Catalyst | 0.45 | Amine Catalyst | 0.45 |
| Surfactant | 1.10 | Surfactant | 1.10 |
| Isocyanate (TDI3.2) | 38.403 | Isocyanate (TDI5.5) | 60.564 |
| Percent Solid | 5.4 | Percent Solid | 9.0 |
| Total | 144.653 | Total | 169.314 |

Additionally, foam may be were made using Formulation A-C and Formulation A-D wherein the only changed constituent is the copolymer polyol blend which is the TPOP05-45 Tianjin material and is re-balanced due to different solid content.

TABLE 9

| Formulation A-C | PPHP | Formulation A-D | PPHP |
|---|---|---|---|
| E960 (OH# 23) | 88.00 | E960 (OH# 23) | 80.00 |
| TPOP05-45 | 12.00 | TPOP05-45 | 20.00 |
| Total Water | 3.20 | Total Water | 5.50 |
| DEOA (neat) | 1.50 | DEOA (neat) | 1.50 |
| Amine Catalyst | 0.46 | Amine Catalyst | 0.46 |
| Surfactant | 1.13 | Surfactant | 1.13 |
| Isocyanate (TDI-3.2-T) | 38.488 | Isocyanate (TDI-5.5-T) | 60.579 |
| Percent Solid | 5.4 | Percent Solid | 9.0 |
| Total | 144.778 | Total | 169.169 |

Some of the foam articles resulting from Formulations A-A, A-B, A-C and A-D may be tested (if available) using the standard test methodologies detailed herein to obtain the performance criteria identified in Table 10.

TABLE 10

| Property | Formulation A-A | Formulation A-B | Formulation A-C | Formulation A-D |
|---|---|---|---|---|
| 25% ILD, N | 179.27 | — | 196.84 | — |
| 50% ILD, N | 318.00 | — | 352.29 | — |
| Density (estimated) | 45 | 28 | 45 | — |
| Hysteresis Loss % | 18.41 | — | 18.16 | — |
| Mass, grams | 770 | — | 751 | — |
| Natural Frequency Hz | 3.06 | — | 3.06 | — |
| A/Ao at Natural | 5.95 | — | 8.30 | — |
| Comfort Number | 18.21 | — | 25.40 | — |

The measured transmissivity of the foam article made using Formulations A-A is generally lower in comfort number and natural frequency and as a result, an occupant of a vehicle sitting on such a seat cushion would have a decreased output acceleration A and such foam article would accordingly provide superior dampening comfort levels.

Accordingly, Formulation A-C and its particular copolymer polyol blend material is considered only a potentially acceptable geographically diverse, locally-available substitute to the E971. For Formulation A-C, a resulting foam article does not have relatively comparable comfort performance (notably lower) while being mostly equivalent in other respects. However, for a seat back application such as for a high water content type foam, such lower performance may be commercially acceptable. Again, since the natural frequency and transmissivity of the foam may also be dependent on the post demold time and the number of cycles the foam article is crushed, it is believed that the Formulation A-C (and others) may be improved by modifying the particular production process to obtain improved performance characteristics. Since the natural frequency of the foam initially drops as the number of crushes increases, and the transmissivity increases as the number of crushes increases, it is believed improved comfort performance may be obtained. Further, a longer cure time in the mold tool (from between about 2 minutes 30 seconds to about 6 minutes to about 10 minutes or more) may be used to obtain a lower density foam article (at a given molecular weight material) to obtain a comparably better performing foam article at about a ten to fifteen percent lower weight. A longer cure time is believed to be particular better suited for locations where a short cycle time is not as costly (i.e., locations with lower labor unit costs).

Figure 4E:
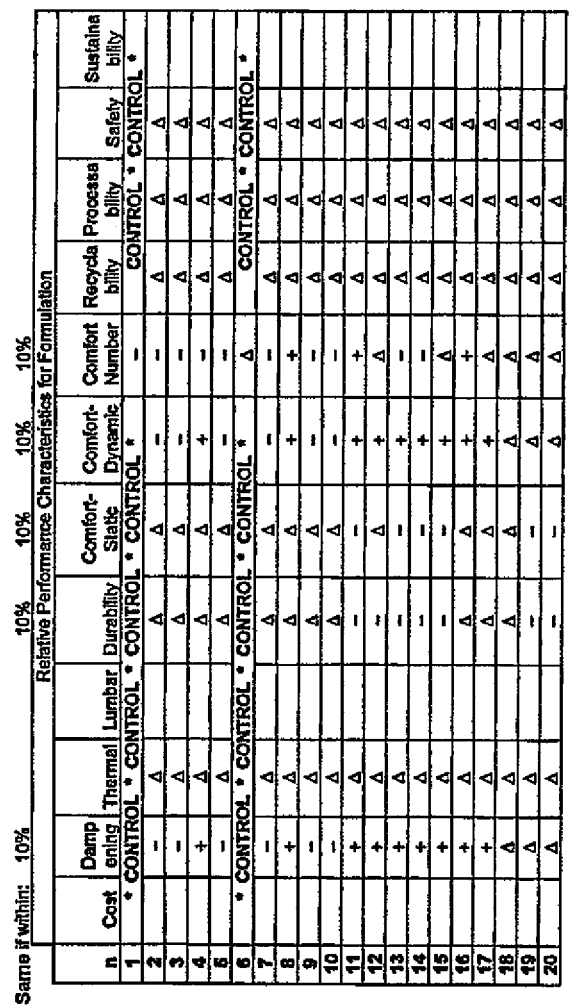
FIGS. 4A-4Y are tables showing physical properties and characteristics of various formulations according to exemplary embodiments.

Additional details and support for the above may be obtained from the chart of formulations included in FIGS. 4A-4X of this application wherein each formulation is identified along with its particular constituents, its processing details, its performance characteristics and its particular application. For the chart of Appendix A, the Formula column, for certain entries, contains two identifiers wherein Formula "A-A" (n=1) in Appendix A relates to Formula A of Table 1 above and Formula "A-B" (n=6) in Appendix A relates to Formula B of Table 1 above. Formula "I-C" (n=21) is Formula C and Formula "J-D" (n=22) is Formula D of Table 2 above. Formula "M-E" (n=25) is Formula E and Formula "N-F" (n=26) is Formula F of Table 4 above. Formula "Q-G" (n=29) is Formula G and Formula "R-H" (n=30) is Formula H of Table 6 above. Formula "AC-A-A" (n=41) is Formula A-A and Formula "AD-A-B" (n=46 is Formula A-B in Table 8; and Formula "AK-A-C" (n=61) is Formula A-C and Formula "AL-A-D" (n=62) is Formula A-D of Table 9 above.

Referring to Tables A and B, the Seat Effective Amplitude Transmissibility value is shown for both the foam formulation and process according to the present disclosure and a standard/conventional high resilient product. The SEAT values of the vehicles were determined using a variety of road conditions and driver/passenger demographics.

The SEAT values shown in Tables A and B compare a seat cushion (62.5 mm thick) and seat back (55 mm thick) formed from a vibration dampening foam in accordance with the present disclosure with a seat bottom cushion (62.5 mm thick) and seat back (55 mm thick) made from a conventional foam material.

As can be seen from Tables A and B, the SEAT value generally decreased using the vibration dampening foam material of the present disclosure. The decrease in the SEAT corresponds to decreased transmission of vibration to the vehicle driver/passenger. The range of SEAT value improvement over conventional foam using the foam formulation and methods of the present invention ranged from approximately 2-24% for use in the seat cushion alone depending on occupant demographic. When the foam formulation methods according to the present disclosure were used for both the seat cushion and seat back, the SEAT improvement ranged from approximately 2-31%.

TABLE A

S.E.A.T. (Seat Effective Amplitude Transmissibility) Results - Passenger Seat

| Occupant Size | Subject #1 Sm. Female | Subject #2 Med. Female | Subject #3 Med. Female | Subject #4 Med. Male | Subject # Med. Male | Subject #6 Lg. Male |
|---|---|---|---|---|---|---|
| High Resilient Cushion/High Resilient Back | | | | | | |
| ChopyFwy | 63.7% | 58.6% | 57.5% | 89.6% | 76.3% | 86.3% |
| Stability | 60.2% | 70.3% | 73.9% | 90.6% | 80.6% | 84.9% |
| Undul_N | 64.0% | 72.0% | 73.4% | 93.1% | 81.4% | 88.8% |
| Average S.E.A.T. | 62.6% | 67.0% | 68.3% | 91.1% | 79.4% | 86.7% |
| Vibration Dampening Cushion/High Resilient Back | | | | | | |
| ChopyFwy | 60.3% | 54.9% | 48.3% | 78.2% | 62.0% | 60.6% |
| Stability | 62.4% | 65.8% | 61.7% | 87.1% | 67.3% | 65.6% |
| Undul_N | 65.3% | 67.2% | 62.8% | 89.8% | 68.9% | 67.4% |
| Average S.E.A.T. | 62.7% | 62.7% | 57.6% | 85.0% | 66.0% | 64.5% |
| Vibration Dampening Cushion/Vibration Dampening Back | | | | | | |
| ChopyFwy | 41.6% | 48.5% | 44.5% | 65.3% | 54.7% | 57.2% |
| Stability | 52.0% | 57.7% | 53.0% | 61.2% | 59.4% | 60.3% |
| Undul_N | 52.3% | 61.0% | 54.1% | 70.2% | 63.7% | 57.8% |
| Average S.E.A.T. | 48.6% | 55.7% | 50.5% | 65.6% | 59.3% | 58.5% |
| Percent improvement cushion only | 0.0% | 4.3% | 10.7% | 6.1% | 13.4% | 22.1% |
| Percent improvement cushion & Back | 14.0 | 11.2% | 17.7% | 25.5% | 20.2% | 28.2% |

TABLE B

S.E.A.T. (Seat Effective Amplitude Transmissibility) Results - Driver Seat

| Occupant Size | Subject #1 Sm. Female | Subject #2 Med. Female | Subject #3 Med. Female | Subject #4 Med. Male | Subject # Med. Male | Subject #6 Lg. Male |
|---|---|---|---|---|---|---|
| High Resilient Cushion/High Resilient Back | | | | | | |
| Road Surface #1 | 65.3% | 81.8% | 65.7% | 117.3% | 107.0% | 93.1% |
| Road Surface #2 | 72.3% | 81.1% | 74.4% | 114.2% | 103.9% | 91.1% |
| Road Surface #3 | 73.8% | 82.0% | 75.1% | 120.8% | 118.6% | 97.4% |
| Average S.E.A.T. | 70.5% | 81.6% | 71.8% | 117.5% | 109.9% | 93.8% |
| Vibration Dampening Cushion/High Resilient Back | | | | | | |
| Road Surface #1 | 66.4% | 76.5% | 61.5% | 97.9% | 83.2% | 78.8% |
| Road Surface #2 | 68.5% | 77.4% | 65.7% | 100.3% | 84.1% | 78.8% |
| Road Surface #3 | 69.9% | 79.5% | 69.9% | 100.9% | 90.2% | 83.8% |
| Average S.E.A.T. | 68.3% | 77.8% | 65.7% | 99.7% | 85.8% | 80.5% |
| Vibration Dampening Cushion/Vibration Dampening Back | | | | | | |
| Road Surface #1 | 63.2% | 76.3% | 60.7% | 91.8% | 90.9% | 68.3% |
| Road Surface #2 | 69.8% | 77.9% | 66.7% | 90.6% | 85.2% | 68.0% |
| Road Surface #3 | 69.7% | 80.6% | 67.8% | 93.4% | 85.8% | 72.2% |
| Average S.E.A.T. | 67.5% | 78.3% | 65.1% | 91.9% | 87.3% | 69.5% |

TABLE B-continued

S.E.A.T. (Seat Effective Amplitude Transmissibility) Results - Driver Seat

| Occupant Size | Subject # | | | | | |
|---|---|---|---|---|---|---|
| | Subject #1 Sm. Female | Subject #2 Med. Female | Subject #3 Med. Female | Subject #4 Med. Male | Subject # Med. Male | Subject #6 Lg. Male |
| Percent improvement cushion only | 2.2% | 3.8 | 6.1% | 17.8% | 24.0% | 13.4% |
| Percent improvement cushion & Back | 2.9% | 3.4% | 6.7% | 25.5% | 22.5% | 24.3% |

Vertical Direction (z-axis)
Only cushion data is used to calculate SEAT percentages
Road Surface #1: freeway
Road Surface #2: medium 2 lane road
Road Surface #3: rough 2 lane road It is important to note that the term "foam article" is intended to be a broad term and not a term of limitation. The term "foam article," as used in this disclosure, may include, without limitation: block foams, vehicle foams (automotive seating bottom and back cushions, headrests, vehicle seat bottom and back bolsters, armrests, bolsters, motorcycle and recreational vehicle seating, plane, boating and train seating, etc.), office furniture seating products (e.g., chairs, stools, lounges, etc.), industrial applications (e.g. engine mounts, compressors, etc.) and other accessories. It is also important to note that the construction and arrangement of the elements of the system and methods disclosed is illustrative only. Although only a few embodiments of the present inventions as currently understood and disclosed herein have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, protocols, etc.) without materially departing from the novel teachings and advantages of the disclosed subject matter and intended to be claimed. Accordingly, all such modifications are intended to be included within the scope of the claims set forth, as currently understood, and in any current or future appended claims. The order or sequence of any process or method steps may be varied or re-sequenced according to alternative embodiments. In any appended claims, including as may be amended in the future, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the spirit of the claims as currently understood and disclosed herein.

What is claimed is:

1. An open cell, foam article made from an open cell, foam material, for use in a seat application, the foam material produced from a reaction mixture comprising:
   a base polyol having a molecular weight of greater than 3000;
   an isocyanate;
   a surfactant; and
   water; and
   wherein the open cell, foam material is a crushed open cell, molded foam material having a natural frequency between about 2.6 hertz and about 4.6 hertz and a transmissivity of about 1.01 to about 3.5 at the natural frequency for a 25 mm-150 mm thick cushion.

2. The open cell, foam article of claim 1, wherein the polyol has a molecular weight of from 5000 to 10000.

3. The open cell, foam article of claim 1, wherein the polyol has a molecular weight of from 6000 to 8000.

4. The open cell, foam article of claim 1, wherein the polyol and the isocyanate have an index of from 90 to 98.

5. The open cell, foam article of claim 1, wherein the surfactant concentration is from 0.2 pph to 0.7 pph.

6. The open cell, foam article of claim 1, wherein the article is a seat base cushion, a seat back cushion, a lumbar cushion, or a bolster cushion.

7. An open cell, polyurethane foam material comprising the reaction product of:
   a base polyol having a molecular weight of from 6000 to 8000;
   an isocyanate;
   a surfactant; and
   water;
   wherein the open cell, polyurethane foam material is a crushed open cell, molded foam material having a natural frequency between about 2.3 hertz and about 4.3 hertz and a transmissivity of about 1.01 to about 3.5 at the natural frequency for a 25 mm-150 mm thick cushion.

8. An open cell, polyurethane foam material comprising the reaction product of:
   an ethylene oxide (EO) capped base polyol having a molecular weight greater than 3000;
   an isocyanate;
   a surfactant; and
   water; and
   wherein the open cell, polyurethane foam material is a crushed open cell, molded polyurethane foam material having a natural frequency of less than 4.6 Hertz and a transmissivity of 3.6 or less for a 50 mm-100 mm thick cushion, and a comfort value of below 13.0, wherein the comfort value is determined by multiplying a peak measured transmissivity by the natural frequency.

* * * * *